(12) United States Patent
Tei et al.

(10) Patent No.: US 8,039,045 B2
(45) Date of Patent: *Oct. 18, 2011

(54) METHOD OF MANUFACTURING A DISK SUBSTRATE FOR A MAGNETIC RECORDING MEDIUM

(75) Inventors: Youichi Tei, Nagano (JP); Akira Iso, Nagano (JP); Kazuhito Higuchi, Nagano (JP); Hajime Kurihara, Nagano (JP); Hiroyuki Uwazumi, Nagano (JP)

(73) Assignee: Fuji Electric Co., Ltd. (JP)

( * ) Notice: Subject to any disclaimer, the term of this patent is extended or adjusted under 35 U.S.C. 154(b) by 1022 days.

This patent is subject to a terminal disclaimer.

(21) Appl. No.: 11/191,170

(22) Filed: Jul. 27, 2005

(65) Prior Publication Data

US 2006/0024431 A1 Feb. 2, 2006

(30) Foreign Application Priority Data

Jul. 27, 2004 (JP) ................................ 2004-219195
Feb. 16, 2005 (JP) ................................ 2005-038617

(51) Int. Cl.
*B05D 5/12* (2006.01)
*B05D 3/10* (2006.01)
*B05D 3/02* (2006.01)
*C23C 18/18* (2006.01)
*C23C 18/31* (2006.01)
*C23C 18/32* (2006.01)
*C23C 18/34* (2006.01)
*C23C 18/50* (2006.01)

(52) U.S. Cl. ........ 427/129; 427/130; 427/131; 427/132; 427/304; 427/305; 427/309; 427/376.6; 427/376.7; 427/383.5; 427/443.1

(58) Field of Classification Search .................. 427/127, 427/128, 129, 130, 131, 132, 165, 305; 428/831, 428/848.8

See application file for complete search history.

(56) References Cited

U.S. PATENT DOCUMENTS 3,523,823 A 8/1970 Kefalas
(Continued)

FOREIGN PATENT DOCUMENTS

GB 1062302 A 3/1967
(Continued)

OTHER PUBLICATIONS

Machine translation (partial) of JP 2000-163743; 2008, JPO, pp. 1-6.*

(Continued)

*Primary Examiner* — Katherine A Bareford
(74) *Attorney, Agent, or Firm* — Rossi, Kimms & McDowell LLP

(57) ABSTRACT

An object of the present invention is to provide a plating method on a glass base plate. The method allows forming a plating film on a base plate composed of a glass material with excellent adhesivity and homogeneity by means of an electroless plating method even to a thickness of 1 μm or more. Before forming a plating film by a step of electroless plating S6, a surface treatment process is conducted on a surface of the base plate composed of a glass material. The surface treatment process comprises at least a step of glass activation treatment S2 to increase quantity of silanol groups on the surface of the base plate at least by a factor of two using an aqueous solution of diluted acid, a step of silane coupling agent treatment S3, a step of palladium catalyst treatment S4, and a step of palladium bonding treatment S5.

12 Claims, 3 Drawing Sheets

U.S. PATENT DOCUMENTS

| | | | |
|---|---|---|---|
| 4,072,781 A * | 2/1978 | Shirahata et al. | 428/336 |
| 4,804,410 A * | 2/1989 | Haga et al. | 106/1.15 |
| 4,894,742 A | 1/1990 | Saito et al. | |
| 5,145,555 A | 9/1992 | Yamaoto | |
| 5,264,981 A | 11/1993 | Campbell et al. | |
| 5,292,361 A * | 3/1994 | Otsuka et al. | 106/1.28 |
| 5,320,908 A * | 6/1994 | Sodervall et al. | 428/461 |
| 5,537,278 A | 7/1996 | Yaegashi et al. | |
| 6,127,052 A * | 10/2000 | Tomari et al. | 428/680 |
| 6,156,413 A | 12/2000 | Tomari et al. | |
| 6,316,097 B1 | 11/2001 | Liu et al. | |
| 6,430,001 B1 | 8/2002 | Chainer et al. | |
| 6,566,687 B2 | 5/2003 | Andry et al. | |
| 6,685,990 B1 | 2/2004 | Zhong et al. | |
| 6,737,281 B1 | 5/2004 | Dang et al. | |
| 6,821,893 B2 * | 11/2004 | Kurachi et al. | 438/690 |
| 6,842,317 B2 | 1/2005 | Sugita et al. | |
| 6,926,977 B2 * | 8/2005 | Osawa et al. | 428/832.1 |
| 7,514,118 B2 * | 4/2009 | Iso et al. | 427/127 |
| 2002/0045069 A1 | 4/2002 | Shinohara et al. | |
| 2002/0113322 A1 | 8/2002 | Terashima et al. | |
| 2002/0192365 A1 | 12/2002 | Kitazoe et al. | |
| 2002/0192379 A1 * | 12/2002 | Imori | 427/304 |
| 2003/0190812 A1 | 10/2003 | Padhi et al. | |
| 2003/0235714 A1 | 12/2003 | Koda et al. | |
| 2004/0265641 A1 * | 12/2004 | Ishii et al. | 428/694 T |
| 2005/0191525 A1 | 9/2005 | Tsumori et al. | |
| 2005/0238929 A1 | 10/2005 | Uwazumi et al. | |
| 2005/0287304 A1 | 12/2005 | Iso et al. | |
| 2006/0024431 A1 | 2/2006 | Tei et al. | |
| 2006/0134325 A1 | 6/2006 | Iso et al. | |
| 2006/0182881 A1 | 8/2006 | Montano et al. | |
| 2006/0210837 A1 | 9/2006 | Kurihara et al. | |
| 2006/0228493 A1 * | 10/2006 | Iso et al. | 427/553 |

FOREIGN PATENT DOCUMENTS

| | | |
|---|---|---|
| GB | 1169657 | 11/1969 |
| GB | 1324653 | 7/1973 |
| IE | 040060 | 9/2004 |
| IE | 20050117 | 11/2005 |
| JP | 48-85614 | 11/1973 |
| JP | 53-19932 | 2/1978 |
| JP | 58-91 B2 | 1/1983 |
| JP | 1-176079 A | 7/1989 |
| JP | 2-18710 A | 1/1990 |
| JP | 02-091810 A | 3/1990 |
| JP | 02-271302 | * 11/1990 |
| JP | 2-271302 A | 11/1990 |
| JP | 5-1384 A | 1/1993 |
| JP | 7-66034 A | 3/1995 |
| JP | 7-334841 A | 12/1995 |
| JP | 8-39728 | 2/1996 |
| JP | 10-226539 A | 8/1998 |
| JP | 2000-082211 A | 3/2000 |
| JP | 2000-163743 A | 6/2000 |
| JP | 2000-203884 A | 7/2000 |
| JP | 2001-059180 A | 3/2001 |
| JP | 2002-220259 A | 8/2002 |
| JP | 2002-309225 A | 10/2002 |
| JP | 2000-163743 A | 6/2006 |

OTHER PUBLICATIONS

Machine English translation of Japan 2001-059180, first published in Japanese Mar. 6, 2001.*

Uwazumi, H. et al., "Recording Performance of the Perpendicular Recording Media with Electroless-Plated Ni-P. Soft Magnetic Underlayer," Digest of 9th Joint MMM/Intermag Conference, GD-13, p. 368 (2004) (Abstract).

Asahi, T. et al., "Novel Soft Magnetic Underlayers for Double-layered Perpendicular Magnetic Recording. Media: Electroless-Deposited Films of CoNiFe-based Alloy," Digest of 9th Joint MMM/Intermag Conference, EP-12, p. 259 (2004) (Abstract).

Saito, S. et al., "Single-Domain and Magnetic Properties of a Soft Magnetic Underlayer Plated on an Al/NiP Disk," Journal of Magnetic Society of Japan (in Japanese), vol. 28, No. 3, p. 289-294 (2004) (Abstract and see Specification).

Search Report and Written Opinion, dated Jun. 30, 2009, issued in corresponding Singapore Patent Application 200504478-9.

Notification of Reasons for Refusal issued in corresponding Japanese Patent Application No. 2005-038617 dated Dec. 1, 2009. Partial English translation provided.

Notice of Second Office Action issued in corresponding Chinese Patent Application No. 200510088454X dated Jan. 29, 2010.

Examination Report issued in corresponding Singapore Patent Application No. 200504478-9 dated Oct. 28, 2010.

* cited by examiner 10 disk substrate
4 plating layer
3 palladium catalyst layer
2 silane coupling agent layer
1 glass substrate 40 protective layer
30 magnetic recording layer
20 nonmagnetic seed layer
10 disk substrate

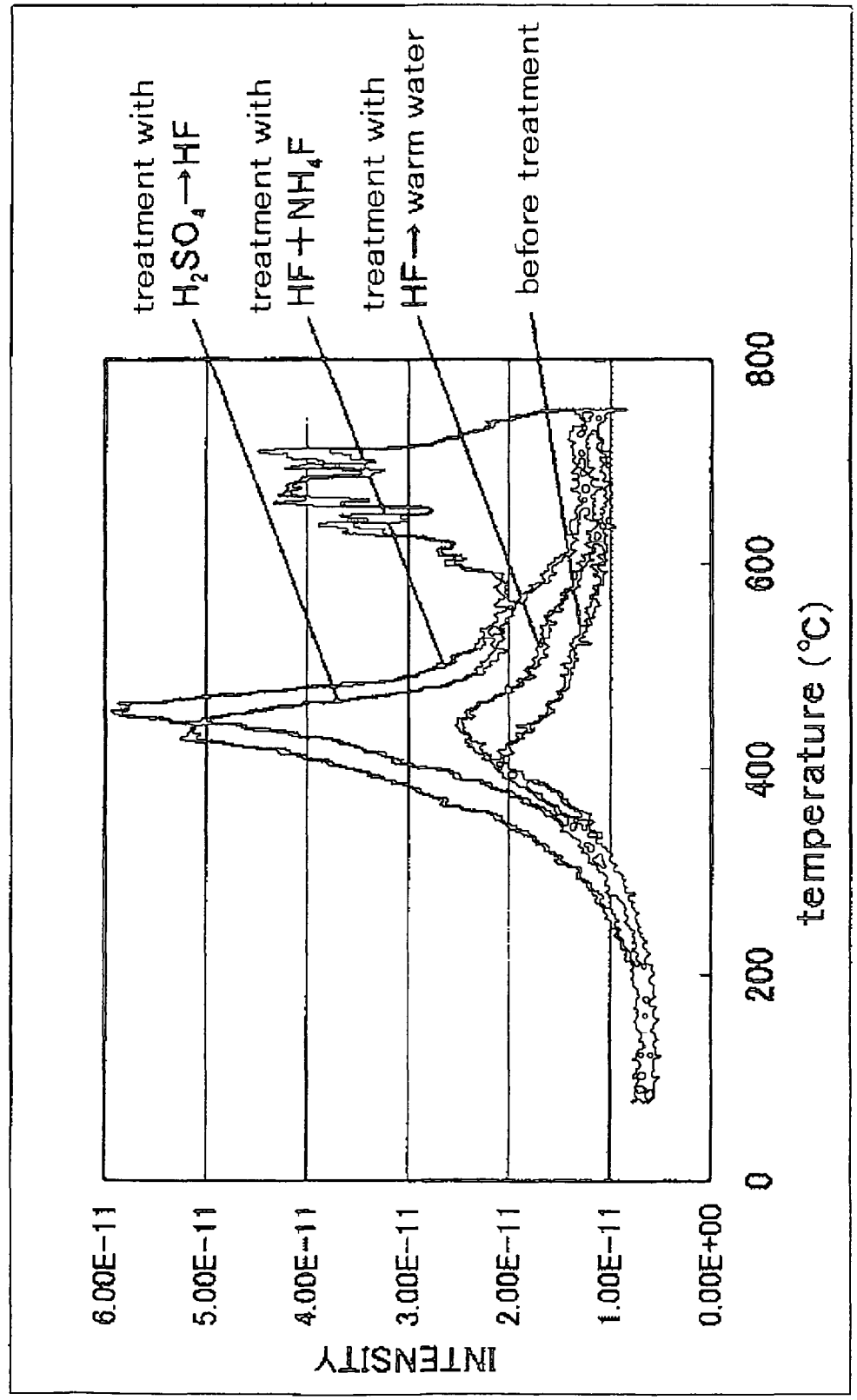

METHOD OF MANUFACTURING A DISK SUBSTRATE FOR A MAGNETIC RECORDING MEDIUM

CROSS REFERENCE TO RELATED APPLICATIONS

This application is based on, and claims priority to, Japanese Application No. 2004-219195, filed on Jul. 27, 2004, and No. 2005-038617, filed on Feb. 16, 2005, the contents of which are incorporated herein by reference.

BACKGROUND OF THE INVENTION

A. Field of the Invention

The present invention relates to a method of plating on a base plate composed of a glass material, a method of manufacturing a disk substrate for a magnetic recording medium using the plating method, and a method of manufacturing a perpendicular magnetic recording medium using the method of manufacturing a disk substrate. In particular, the methods are beneficially applied to a magnetic recording medium mounted on a hard disk drive.

B. Description of the Related Art

In recent years, hard disk drives have been often used for a memory device in computers or digital household appliances. In the case of a longitudinal magnetic recording system, a magnetic disk (hard disk) as a magnetic recording medium mounted on the hard disk drive is generally manufactured by the following procedure. A Ni—P layer is formed on the surface of a nonmagnetic substrate with a disk shape by an electroless plating method. The surface of the Ni—P layer is subjected to necessary smoothing and texturing treatments. Then, an underlayer of a nonmagnetic metal, a magnetic layer of a ferromagnetic alloy thin film, a protective layer, and other layers are sequentially formed on this surface by a sputtering method or other techniques.

Traditionally, an aluminum alloy has been used as the material of the nonmagnetic substrate. Recently, hard disk drives are rapidly evolving to have higher capacity, smaller size, and lighter weight. In conjunction with this trend, a magnetic disk is required to have higher flatness, smaller diameter, and less thickness than previously. Conventional substrates of an aluminum alloy can hardly meet those requirements of the market. Thus, glass is being used for a substrate material.

A glass substrate must exhibit surface characteristics similar to those in an aluminum substrate by forming a Ni—P layer on the surface to obtain a magnetic disk exhibiting favorable performance. However, it is technically difficult to form a plating film with satisfactory adhesivity, homogeneity, and smoothness on a base plate composed of a glass material by an electroless plating method. To solve this problem, various methods have been proposed as pre- and post-treatments for the electroless plating.

In one example of such methods, electroless plating is conducted after a treatment using an aqueous solution containing palladium chloride and tin (II) chloride, and a treatment using an aqueous solution of alkali carbonate, an aqueous solution of alkali hydrogen carbonate, or a mixture of these aqueous solutions. (See Japanese Unexamined Patent Application Publication No. H1-176079.) In another method, electroless plating is conducted after a two-stage etching treatment using a chromic acid—sulfuric acid mixed solution and a nitric acid solution, an etching treatment using a strong alkaline solution, a sensitization treatment using dilute tin (II) chloride, and an activation treatment using a silver salt solution and a palladium salt solution. (See Japanese Unexamined Patent Application Publication No. S53-19932.) In another example, electroless plating is conducted after cleaning using a warm liquid of sulfuric acid and potassium dichromate, sensitization using tin (II) chloride acidified with hydrochloric acid, and activation using a palladium chloride solution. (See Japanese Unexamined Patent Application Publication No. S48-85614.) In still another method, electroless plating is conducted after alkali degreasing, etching using hydrofluoric acid, sensitization using a tin (II) chloride solution, and activation using a palladium chloride solution.

Japanese Unexamined Patent Application Publication No. H7-334841 proposes a method of electroless plating to form a Ni—P layer exhibiting sufficient adhesivity and smoothness on a glass substrate to obtain a favorable magnetic disk. In this method, electroless Ni—P plating is conducted after the pretreatments of: sufficiently degreasing the glass substrate, etching to enhance anchoring effect, removing contamination that is produced in the etching process and adhered on the substrate surface, using a surface modulation process to chemically homogenize the substrate surface, using a sensitizing treatment, and using an activation treatment. The method preferably uses an aqueous solution containing hydrofluoric acid and potassium hydrofluoride for the etching solution, hydrochloric acid for removing the surface contaminant, and an aqueous solution containing sodium methoxide for the surface modulation.

Japanese Unexamined Patent Application Publication No. 2000-163743 proposes a method of forming an electroless Ni—P plating layer on a glass substrate for a magnetic disk. In this method, electroless Ni—P plating is conducted after sequential treatments on a glass substrate surface including: alkali degreasing treatment using a potassium hydroxide solution, etching treatment using hydrofluoric acid, treatment with warm pure water, silane coupling agent treatment, activator treatment using an aqueous solution of palladium chloride, and accelerator treatment using an aqueous solution of sodium hypophosphite. Heat treatment is conducted after the electroless Ni—P plating.

Meanwhile, a perpendicular magnetic recording system is drawing attention in place of a conventional longitudinal magnetic recording system as a technology to attain high density of magnetic recording. In particular, a double layer perpendicular magnetic recording medium as disclosed in Japanese Patent Publication No. S58-91 is known as a perpendicular magnetic recording medium for achieving high density recording. The double layer perpendicular magnetic recording medium is provided with a soft magnetic film called a soft magnetic backing layer under a magnetic recording layer that records information. The soft magnetic backing layer easily permeates the magnetic flux generated from the magnetic head and exhibits high saturation magnetic flux density Bs. The double layer perpendicular magnetic recording medium increases the intensity and gradient of the magnetic field generated by the magnetic head, improving recording resolution and increasing leakage flux from the medium.

A soft magnetic backing layer generally uses a film 200 nm to 500 nm thick that is formed by a sputtering method and is composed of a Ni—Fe alloy, an Fe—Si—Al alloy, or an amorphous alloy of mainly cobalt. However, forming such a relatively thick film by a sputtering method is inappropriate from the viewpoints of manufacturing costs and mass productivity. To solve this problem, use of a soft magnetic film formed by an electroless plating method has been proposed for a soft magnetic backing layer. Japanese Unexamined Patent Application Publication No. H7-66034, for example, proposes to produce a NiFeP film by a plating method on a disk substrate of an aluminum alloy provided with a nonmagnetic NiP plating film and to use for a soft magnetic backing layer.

Digest of 9th Joint MMM/Intermag Conference, EP-12, p. 259 (2004) proposes a CoNiFeP plating film formed on a glass substrate. Digest of 9th Joint MMM/Intermag Conference, GD-13, p. 368 (2004) proposes a soft magnetic NiP plating film formed on an aluminum alloy disk substrate provided with a nonmagnetic Ni—P plating film.

If a soft magnetic backing layer forms a magnetic domain structure and generates a magnetic transition region called a magnetic domain wall, the noise called spike noise that is generated from this magnetic domain wall is known to degrade the performance as a perpendicular magnetic recording medium. Consequently, formation of the magnetic domain wall must be suppressed in a soft magnetic backing layer.

The NiFeP plating film mentioned previously is liable to form a magnetic domain wall. Thus, Journal of Magnetic Society of Japan (in Japanese), Vol. 28, No. 3, p. 289-294 (2004) discloses that the domain wall formation needs to be suppressed by forming a Mnlr alloy thin film on the plating film by a sputtering method. Formation of a magnetic domain wall in the CoNiFeP plating film mentioned previously is disclosed to be suppressed by conducting plating in a magnetic field. A soft magnetic NiP plating film is said not to generate spike noise.

Japanese Unexamined Patent Application Publication No. H2-18710 proposes that the generation of spike noise be suppressed by forming a backing layer composed of cobalt or a cobalt alloy having coercivity Hc of 30 to 300 Oe so as to exhibit magnetic anisotropy along the circumferential direction of the disk substrate. While the backing layer in this method is formed by a dry process such as a sputtering method, an evaporation method, or the like, Japanese Unexamined Patent Application Publication No. H5-1384 proposes a method of forming a Co—B film that exhibits an Hc of at least 30 Oe and can suppress spike noise, by a plating method. The film is suggested to be possibly used for a soft magnetic backing layer.

The NiFeP plating film mentioned previously needs to suppress formation of a magnetic domain wall by forming a Mnlr alloy thin film on the plating film employing a sputtering method to suppress spike noise. The requirement for adding a new film by means of a sputtering method for suppressing a magnetic domain wall detracts from the merit of the plating method in production costs and mass productivity.

In the CoNiFeP plating film mentioned previously, application of a homogeneous magnetic field to a substrate in a plating bath is difficult in a practical manufacturing process. The mass productivity is also liable to be impaired. An iron-containing plating film, exhibiting high Bs value, is favorable for a soft magnetic backing layer. However, since iron forms an ion of ionic valence of two and an ion of ionic valence of three, securing the stability of a plating bath is known to be generally difficult. Thus, the iron-containing plating film is also inferior in mass productivity.

As to the correlation between coercivity and magnetic domain wall formation of the soft magnetic backing layer formed by a plating method, it has been clarified that a coercivity value of the plating film of not smaller than 30 Oe cannot completely prevent the magnetic domain wall formation, although some tendency of suppression was observed. It has been further clarified that the increase of the coercivity deteriorates the read/write performance.

As described above, for a disk substrate of a magnetic recording medium mounted on a hard disk drive, a glass disk substrate using crystallized glass or chemically strengthened glass is used as well as an aluminum alloy substrate provided with a nonmagnetic NiP plating film. The glass substrates, having high strength, are mainly used in a magnetic recording medium of a mobile hard disk drive, which needs high shock resistance. The above-described electroless plating method for forming a soft magnetic plating film as a backing layer is effective to improve the productivity also in a glass disk substrate for a perpendicular magnetic recording medium.

The electroless plating films composed of a nonmagnetic Ni—P alloy have been practically used in an aluminum alloy substrate for hard discs, and the manufacturing method for mass production and the surface smoothing technique by polishing are well known. Consequently, in a glass substrate, too, if a nonmagnetic or soft magnetic plating layer that has good adhesivity as an underlayer and satisfactory smoothness can be formed by means of an electroless plating method with a sufficient thickness (at least 1 μm) for obtaining a magnetic disk that performs well, the glass substrate with an electroless plating film is very promising for a substrate of a magnetic recording medium from the view point of production costs.

Unfortunately, the known methods of electroless plating as described above have failed to form, on a glass substrate, a soft magnetic plating film of Co—Ni—P, Ni—P, Ni—Fe—P, or Co—Ni—Fe—P, and a nonmagnetic plating film of Ni—P with a sufficient thickness (in the range of 1 μm to 3 μm) for obtaining a favorable magnetic disk and with satisfactory adhesivity, homogeneity, and smoothness at that thickness.

An underlayer of Ni—P or the like is known to be formed by a sputtering method, too. It is, however, difficult to form an underlayer directly on a glass substrate since adhesivity between glass and metal is poor. To cope with this difficulty, a layer containing titanium or chromium, which exhibit relatively good adhesivity with glass among the metals, needs to be formed on the glass substrate, and an underlayer is formed on the adhesion layer of titanium or chromium. The titanium or chromium of the adhesion layer in this method does not exhibit enough adhesivity. So, when the underlayer or adhesion layer is thick, the adhesivity deteriorates due to the stress caused by the difference of expansion coefficients. Perpendicular magnetic recording media, which are being actively developed recently, need a relatively thick layer of soft magnetic backing layer in the range of 0.2 μm to 3.0 μm. The soft magnetic backing layer, when deposited by sputtering, involves a problem of degradation of adhesivity and in addition a problem of high costs.

The present invention is directed to overcoming or at least reducing the effects of one or more of the problems set forth above.

SUMMARY OF THE INVENTION

In view of the above problems, an object of the present invention is to provide a method of plating on a glass base plate. The method allows a plating film to be formed on a glass base plate by an electroless plating method with satisfactory adhesivity and homogeneity, even on a base plate of glass material with a film thickness not smaller than 1 μm. Another object of the invention is to provide a method of manufacturing a disk substrate for a magnetic recording medium that satisfies thickness, adhesivity, homogeneity, smoothness, and noise characteristic of a plating film required by a hard disk as a magnetic recording medium by forming a plating film on a glass substrate with a disk shape employing the method of plating according to the invention. Still another object is to provide a method of manufacturing a perpendicular magnetic recording medium employing the method of manufacturing a disk substrate.

To accomplish these and other objects, a method of plating on a glass base plate according to the invention comprises a process of treatments on a surface of a base plate composed of a glass material. The process of treatments includes at least a glass activation treatment to increase the quantity of silanol groups on the surface of the base plate by at least a factor of two using an aqueous solution of diluted acid, a silane coupling agent treatment, a palladium catalyst treatment, and a palladium bonding treatment, and a process of forming a plating film by means of an electroless plating method.

The glass activation treatment preferably comprises a treatment using hydrochloric acid of 0.001 wt % to 1 wt % and sulfuric acid, nitric acid, or hydrochloric acid of 0.1 wt % to 10 wt %, or a treatment using hydrochloric acid of 0.001 wt % to 1 wt % and ammonium fluoride of 0.0005 wt % to 0.5 wt %. In order to significantly increase the quantity of silanol groups and enhance adhesivity it is more favorable for the glass activation to be a treatment using sulfuric acid, nitric acid, or a hydrochloric acid of 0.1 wt % to 10 wt % followed by a treatment using hydrofluoric acid of 0.001 wt % to 1 wt %. It is favorable as well that the glass activation consist of a treatment using a mixture of an aqueous solution of hydrofluoric acid of 0.001 wt % to 1 wt % and an aqueous solution of ammonium fluoride of 0.0005 wt % to 0.5 wt %.

Advantageously, the silane coupling agent treatment consists of a treatment using a silane coupling agent having a structure represented by a general formula (I):

$$(C_mH_{2m+1}O)_3Si(CH_2)_nNHR \qquad (I)$$

where R is selected from H, $C_pH_{2p}NH_2$, $CONH_2$, and $C_6H_5$, and each of m, n, and p represents a positive integer. In one preferred embodiment, the palladium catalyst treatment consists of a treatment using a mixed solution of palladium chloride and diluted sodium hydroxide or a mixed solution of palladium chloride and diluted potassium hydroxide. In another preferred embodiment, the palladium bonding treatment consists of a treatment using an aqueous solution of hypophosphorous acid.

A method of manufacturing a disk substrate for a magnetic recording medium according to the invention comprises forming a nonmagnetic or soft magnetic plating film on a surface of a base plate of a glass substrate with a disk shape employing the method of plating as described above, in which the method of manufacturing a disk substrate comprises a process of treatments including at least a glass activation treatment to increase quantity of silanol groups on the surface of the glass substrate by at least a factor of two using an aqueous solution of diluted acid, a silane coupling agent treatment, a palladium catalyst treatment, and a palladium bonding treatment; and a process of forming the plating film.

The surface roughness Ra of the glass substrate is preferably at most 0.5 nm in order to improve smoothness of the surface of the disk substrate after the plating process and enhance recording density. Advantageously, a plating film composed of a Ni—P alloy is formed by means of an electroless plating method and then a heat treatment is conducted while controlling a rate of temperature rise. This process improves adhesivity of the plating film of Ni—P-alloy. The heat treatment preferably consists of a process of maintaining a treatment temperature in a range of 250° C. to 300° C. for at least 1 hour after ramping the temperature from room temperature (25° C.) to the treatment temperature over the course of at least 2 hours.

According to a manufacturing method of the invention, a plating film with from soft magnetic to nonmagnetic property that is free from defects such as blisters and exhibits excellent adhesivity can be formed of a Ni—P alloy containing phosphorus in a range of 1.0 wt % to 13.0 wt % and to a thickness at least 1.0 μm that is sufficient for a substrate of a hard disk, by means of an electroless plating method. In the method of manufacturing a disk substrate, a silane coupling agent layer is formed on a glass substrate by a silane coupling agent treatment, a palladium catalyst layer is formed on the silane coupling agent layer by the palladium catalyst treatment, and a soft magnetic plating layer is formed on the palladium catalyst layer by an electroless plating method; and a disk substrate for a perpendicular magnetic recording medium is manufactured.

As the soft magnetic plating layer, a soft magnetic plating film can be formed by an electroless plating method, the soft magnetic plating film being free from defects such as blisters, exhibiting excellent adhesivity and noise characteristic, and having a thickness in a range of 0.2 μm to 3 μm, which is necessary for a soft magnetic backing layer of a perpendicular magnetic recording medium. The soft magnetic plating film is preferably composed of a Co—Ni—P alloy containing phosphorus in a range of 3 at % to 20 at % and at least 45 at % of cobalt in proportion to the number of atoms of cobalt and nickel (Co/(Co+Ni)).

A perpendicular magnetic recording medium exhibiting excellent noise characteristic and productivity can be manufactured by manufacturing a disk substrate for a magnetic recording medium by the method of manufacturing a disk substrate for a magnetic recording medium according to the invention, and sequentially forming at least a nonmagnetic seed layer, a magnetic recording layer, and a protective layer on the disk substrate, wherein the soft magnetic plating layer in the disk substrate is utilized as at least a part of a soft magnetic backing layer for the magnetic recording layer.

A method of plating on a glass base plate according to the invention allows even a thick plating film of at least 1 μm to be formed on a base plate composed of a glass material in general by an electroless plating method with good adhesivity and homogeneity.

A method of manufacturing a disk substrate for a magnetic recording medium according to the invention allows a nonmagnetic or soft magnetic plating film that is free from defects such as blisters and exhibits excellent adhesivity to be formed on a glass substrate with a necessary thickness, homogeneity, and smoothness. Thus, the method provides a disk substrate for obtaining a magnetic recording medium with good performance.

A method of manufacturing a perpendicular magnetic recording medium according to the invention forms a soft magnetic plating film on a glass substrate to be utilized as a soft magnetic backing layer, thereby providing a perpendicular magnetic recording medium exhibiting a favorable noise characteristic. Because the soft magnetic backing layer is formed by an electroless plating method that achieves high productivity, even such a thick film can be manufactured in a remarkably lower cost as compared with manufacture by a sputtering method, for example.

The following describes some preferred embodiments to manufacture a disk substrate for a magnetic recording medium applying a method of plating on a glass base plate according to the invention. The method of plating on a glass base plate according to the invention is, however, not limited to this application. The same effects are obtained when a nonmagnetic or magnetic plating film is formed by an electroless plating method on a base plate of a glass material in general, with a thickness of at least 1 μm and with good adhesivity and homogeneity.

The base plates of a glass material in general include for example, glass for flat panel displays such as liquid crystal, PDP, FED, EL, and the like, glass for information devices such as copiers, and further, glass for optical communication devices, cars, medical equipment, and building materials.

BRIEF DESCRIPTION OF THE DRAWINGS

The foregoing advantages and features of the invention will become apparent upon reference to the following detailed description and the accompanying drawings, of which:

FIG. 4 is a graph showing an analysis result on the generated quantity of silanol groups (Si—OH) on a surface of a glass substrate after various activation treatments measured by a thermal desorption mass spectroscopy apparatus.

DETAILED DESCRIPTION OF SPECIFIC EMBODIMENTS

Figure 1:
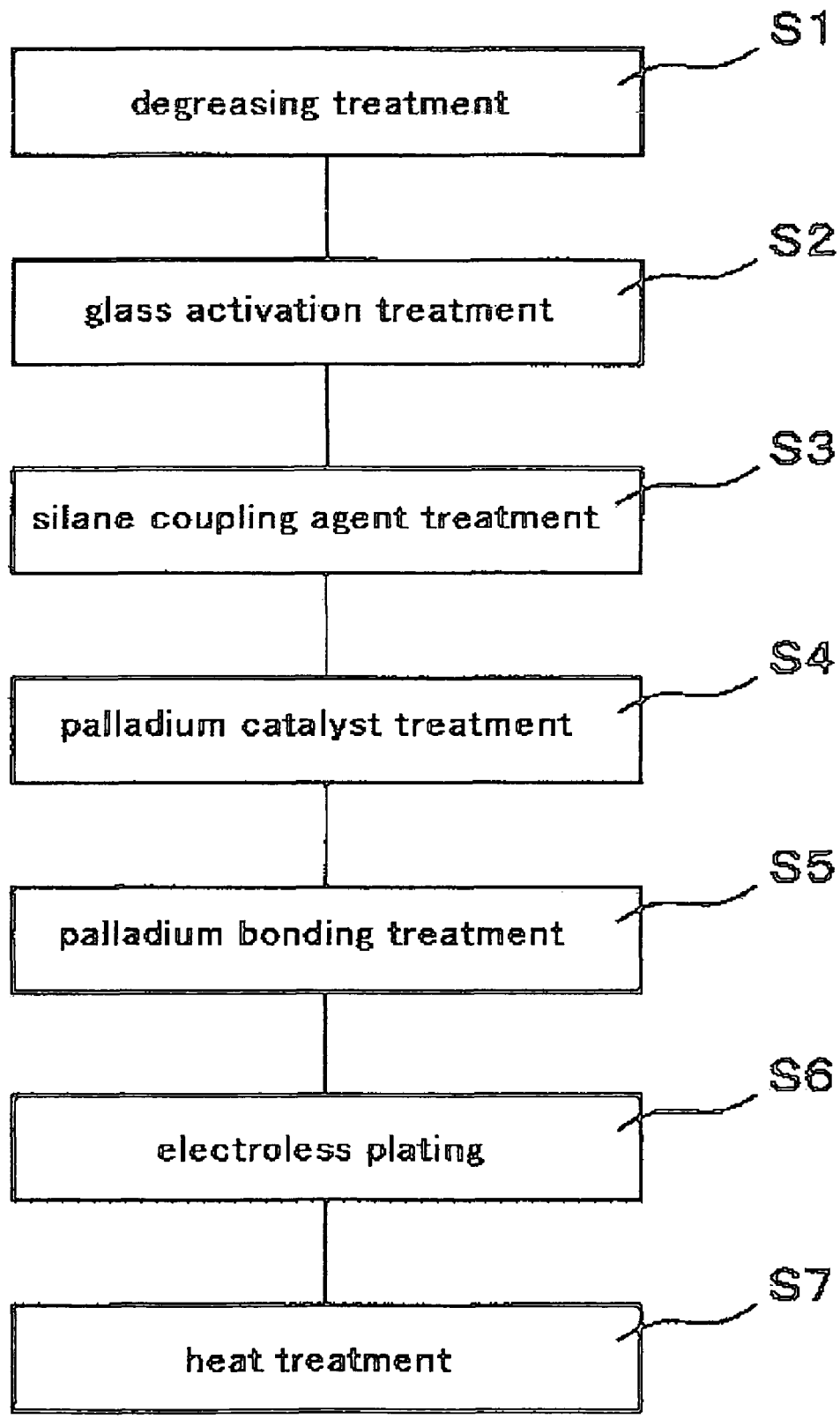
FIG. 1 shows a procedure in a method of manufacturing a disk substrate for a magnetic recording medium of an embodiment according to the invention.
Figure 2:
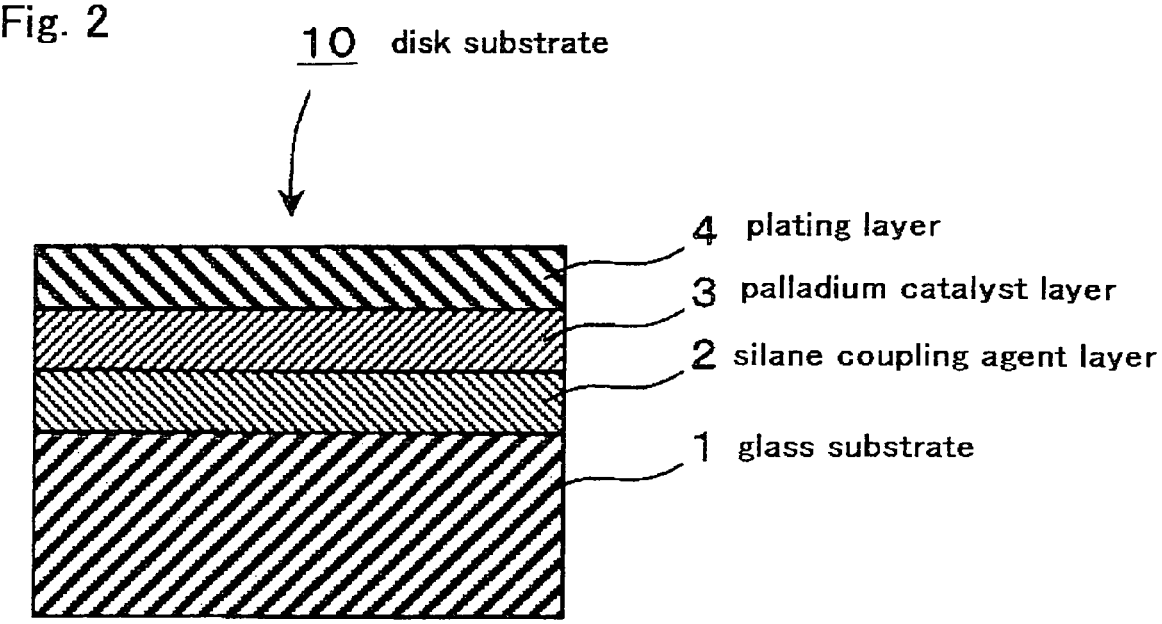
FIG. 2 is a schematic sectional view of a disk substrate for a magnetic recording medium manufactured by a manufacturing method of an embodiment according to the invention.

Embodiment of a Method of Manufacturing a Disk Substrate for a Magnetic Recording Medium FIG. 1 shows processes in an embodiment of a method of manufacturing a disk substrate for a magnetic recording medium according to an aspect of the invention, the manufacturing method employing a method of plating on a glass base plate according to an aspect of the invention. FIG. 2 is a schematic sectional view of a disk substrate for a magnetic recording medium manufactured by a manufacturing method of the embodiment.

As shown in FIG. 2, disk substrate 10 for a magnetic recording medium manufactured by a manufacturing method of an embodiment of the invention comprises glass substrate 1 with a disk shape, silane coupling agent layer 2 formed on glass substrate 1, palladium catalyst layer 3 formed on silane coupling agent layer 2, and plating layer 4 formed on palladium catalyst layer 3.

Though not shown in the figure, silane coupling agent layer 2, palladium catalyst layer 3, and plating layer 4 may also be provided on the other side of glass substrate 1.

Glass substrate 1 used can be a substrate having a surface roughness Ra (defined by JIS (Japanese Industrial Standards) B0601) of at most 0.5 nm. More preferably, a substrate used has a micro surface waviness Wa (defined by JIS B0601) of at most 0.5 nm.

The surface roughness Ra of glass substrate 1 has a physical anchoring effect on plating layer 4. A certain degree of improvement in adhesivity of plating layer 4 can be expected by using a substrate with relatively large Ra. A method of the invention can maintain satisfactory adhesivity of plating layer 4 in an ultra smooth glass substrate having a surface roughness Ra≦0.5 nm, in which the physical anchoring effect is hardly expected, as well as in a glass substrate having a surface roughness Ra>0.5 nm.

This is an effect caused by a strong chemical bond at the interface between glass substrate 1 and silane coupling agent layer 2 formed by the dehydration condensation reaction between the silanol groups (Si—OH) on the surface of glass substrate 1 and the silanol groups of the silane coupling agent forming silane coupling agent layer 2 that will be described later.

By forming a nonmagnetic Ni—P plating film of high phosphorus concentration on a glass substrate, plating layer 4 is used for precise smoothing for high density recording which is hardly accomplished in a high rigidity glass substrate, for manufacturing an LZT substrate (laser zone texturing substrate), for manufacturing an anisotropically aligned medium by tape texturing, and for increasing coercivity of a magnetic film by applying a bias voltage on the substrate in the sputtering process of the magnetic film. By forming a soft magnetic Ni—P plating film of low phosphorus concentration on a glass substrate, the Ni—P plating film is used for a soft magnetic backing layer with high saturation magnetic flux density to form a double layer perpendicular magnetic recording medium facilitating high density recording. By forming a from nonmagnetic to soft magnetic Ni—P plating film of medium phosphorus concentration, the Ni—P plating film is used for an underlayer plating film (strike plating) as an adhesion layer for forming a Ni—P plating film of low phosphorus concentration on the underlayer plating film, in addition to the applications of the high phosphorus concentration Ni—P plating film and the low phosphorus concentration Ni—P plating film described above.

In addition to the Ni—P soft magnetic plating film described above, soft magnetic plating films of Co—Ni—P, Ni—Fe—P, and Co—Ni—Fe—P can also be employed for a soft magnetic backing layer of a perpendicular magnetic recording medium. In particular, a soft magnetic plating film of a Co—Ni—P alloy containing phosphorus in a range of 3 at % to 20 at % and cobalt at least 45 at % in proportion to the number of atoms of cobalt and nickel (Co/(Co+Ni)) is favorably utilized for a soft magnetic backing layer avoiding generation of spike noises from the soft magnetic backing layer.

A method of manufacturing disk substrate 10 for a magnetic recording medium in this embodiment comprises a degreasing treatment S1, a glass activation treatment S2, a silane coupling agent treatment S3, a palladium catalyst treatment S4, and a palladium bonding treatment S5 sequentially conducted on the surface of glass substrate 1 as a base plate of a glass material, and electroless plating S6 followed by heat treatment S7.

The glass activation treatment S2 preferably comprises a treatment using hydrofluoric acid of 0.001 wt % to 1 wt % and sulfuric acid, nitric acid, or hydrochloric acid of 0.1 wt % to 10 wt %, or a treatment using hydrofluoric acid of 0.001 wt % to 1 wt % and ammonium fluoride of 0.0005 wt % to 0.5 wt %, to increase the silanol groups on glass substrate 1 at least by a factor of two and enhance adhesivity. In particular, combined treatments of a treatment using sulfuric acid, nitric acid, or hydrochloric acid of 0.1 wt % to 10 wt % and a subsequent treatment using hydrofluoric acid of 0.001 wt % to 1 wt % increases the quantity of silanol groups on the surface of glass substrate 1 by a factor of three to four or more. A treatment using a mixture of an aqueous solution of hydrofluoric acid of 0.001 wt % to 1 wt % and an aqueous solution of ammonium fluoride of 0.0005 wt % to 0.5 wt % increases the quantity of silanol groups at least by a factor of three. Therefore, these treatments show significant effect to enhance adhesivity.

A method of plating on a glass base plate of the invention can be used in the various applications described above by changing the material of the plating film formed by electroless plating S6. A heat treatment S7 can be omitted in some material or application of the plating film. Nevertheless, a plating film is effective for enhancing adhesivity.

First Embodiment

The following describes a first embodiment of a method of manufacturing a disk substrate for a magnetic recording medium in which plating layer 4 is formed of one of from nonmagnetic to soft magnetic Ni—P alloy plating films by electroless plating S6.

Degreasing Treatment S1

The first step of this embodiment is a degreasing treatment S1 on a surface of glass substrate 1. The degreasing treatment S1 can be conducted in one stage using an aqueous solution of a basic inorganic compound. However, the step is preferably carried out in two stages including a treatment using an alkaline detergent solution and a treatment using an aqueous solution of a basic inorganic compound.

An alkaline detergent used in this step shows a pH value in a range of 9.0 to 11.0 in a solution thereof, and specifically, includes an anion type surface active agent. The alkaline detergent solution preferably contains from 1 to 10 wt % of alkaline detergent. The treatment using an alkaline detergent solution is preferably conducted by dipping glass substrate 1 in an alkaline detergent solution. As required, agitation of the detergent solution or irradiation of ultrasonic wave may bemused simultaneously. This treatment is generally carried out at a temperature of 20 to 70° C. and for 1 to 10 minutes.

Basic inorganic compounds used in this step include NaOH, KOH, LiOH, and $Ba(OH)_2$. An aqueous solution of the basic inorganic compound contains a basic inorganic compound preferably in the range of 1 to 15 wt %, more preferably in the range of 5 to 10 wt %, and a pH value is preferably in the range of 13.0 to 14.0. A treatment using an aqueous solution of a basic inorganic compound is preferably conducted by dipping glass substrate 1 in an aqueous solution of a basic inorganic compound. As required, agitation of the aqueous solution or irradiation of ultrasonic wave to the aqueous solution may be used simultaneously. This treatment is generally carried out at a temperature of 20 to 70° C. and for 1 to 10 minutes.

By conducting the degreasing treatment S1, organic thin films or particles adhering on glass substrate 1 are removed, to clean the surface of glass substrate 1.

Glass Activation Treatment S2

Next, a glass activation treatment S2 is conducted. The glass activation treatment S2 peels off inactive oxide films existing on the surface of glass substrate 1 and at the same time, modifies the functional groups on the surface of glass substrate 1 into silanol groups (Si—OH) that exhibit reactive property, to activate the surface of glass substrate 1 for the reaction with a silane coupling agent that will be described later.

Silanol groups (Si—OH) on the glass substrate surface can be generated in a little amount by a warm water treatment as disclosed in Japanese Unexamined Patent Application Publication No. 2000-163743. But, the increase of generated silanol groups is in a limited amount as a result of the action of water ($H_2O$) molecules that essentially rarely dissociate to H+ and OH—. On the contrary, a dipping treatment of the glass substrate in a specified diluted acid solution containing plenty of H+ ions can generate four or more times of silanol groups (Si—OH) as compared with the effect of the warm water treatment.

A glass activation treatment S2 is carried out by dipping glass substrate 1 in an aqueous solution of diluted acid. Acids that can be used in the aqueous solution of diluted acid include substances that contain a fluorine atom and can remove an oxide film on the glass surface, such as hydrofluoric acid (HF), fluoroboric acid ($HBF_4$), hexafluorosilicic acid ($H_2SiF_6$) and hexafluorophosphoric acid ($HPF_6$). A preferable acid among them is hydrofluoric acid. An inorganic salt compound can be added in the aqueous solution of diluted acid. An inorganic salt compound to be added is preferably a fluoride compound such as ammonium fluoride or sodium fluoride.

An aqueous solution of diluted acid used in this step is preferably hydrofluoric acid of in the range of 0.001 wt % to 1 wt %, or a mixed solution of the hydrofluoric acid of 0.001 wt % to 1 wt % and sulfuric acid, hydrochloric acid, or nitric acid of 0.001 wt % to 1 wt %. A mixed solution of the hydrofluoric acid of 0.001 wt % to 1 wt % and ammonium fluoride of 0.0005 wt % to 0.5 wt % is likewise preferable. The treatment using an aqueous solution of diluted acid that contains a fluorine atom is preferably preceded or followed by an additional treatment using an aqueous solution of diluted inorganic acid that does not contain a fluorine atom, including a treatment with diluted sulfuric acid ($H_2SO_4$), a treatment with diluted hydrochloric acid (HCl), a treatment with a diluted nitric acid ($HNO_3$), and/or a treatment with a diluted hydrogen peroxide ($H_2O_2$) of 0.1 wt % to 10 wt %. These treatments are generally carried out at a temperature of 20 to 50° C. and for 1 to 10 minutes.

Silane Coupling Agent Treatment S3

Next, a silane coupling agent treatment S3 is conducted on glass substrate 1 that has been subjected to the glass activation treatment S2, to form silane coupling agent layer 2 on glass substrate 1. Silane coupling agents that can be used in this step are alkyl trialkoxysilanes (so-called amino type silane coupling agents) that have a nitrogen substituent (amino group) on an alkyl group, preferably including the compounds having a structure represented by the following general formula (I).

$$(C_mH_{2m+1}O)_3Si(CH_2)_nNHR \qquad (I)$$

where R is selected from H, $C_pH_{2p}NH_2$, $CONH_2$, and $C_6H_5$, and each of m, n, and p represents a positive integer. Preferably, m is 1 or 2, n is an integer from 2 to 4, and p is an integer from 2 to 4. More preferably, a compound is selected from the compounds of (II) to (IX) or a mixture of these compounds is used.

$$(CH_3O)_3SiC_3H_6NH_2 \qquad (II)$$

[3-aminopropyl trimethoxysilane]

$$(C_2H_5O)_3SiC_3H_6NH_2 \qquad (III)$$

[3-aminopropyl triethoxysilane]

$$(CH_3O)_3SiC_3H_6NHC_2H_4NH_2 \qquad (IV)$$

[N-(2-aminoethyl)-3-aminopropyl trimethoxysilane]

$$(C_2H_5O)_3SiC_3H_6NHC_2H_4NH_2 \qquad (V)$$

[N-(2-aminoethyl)-3-aminopropyl triethoxysilane]

$$(CH_3O)_3SiC_3H_6NHC_6H_5 \qquad (VI)$$

[N-phenyl-3-aminopropyl trimethoxysilane]

$$(C_2H_5O)_3SiC_3H_6NHCONH_2 \qquad (VII)$$

[3-ureidopropyl triethoxysilane]

$$(C_2H_5O)_3SiC_3H_6N\!=\!C(C_4H_9)CH_3 \qquad (VIII)$$

[3-triethoxysilyl-N-(1,3-dimethylbutylidene)-propylamine]

$$(CH_3O)_2(CH_3)SiC_3H_6NHC_2H_4NH_2 \qquad (IX)$$

[N-(2-aminoethyl)-3-aminopropylmethyl dimethoxysilane]

A silane coupling agent is generally used in an aqueous solution of 0.1 to 4.0 wt %. In the case of a silane coupling agent exhibiting low solubility in water (for example, the compound of formula (VII)) may be used by dissolving in an aqueous solution of acetic acid of 0.1 to 2.0 wt % or in a mixed solvent of water-alcohol (for example, methanol, ethanol, or the like). (The mixed solvent can further contain acetic acid.)

The silane coupling agent treatment S3 is preferably carried out by dipping glass substrate 1 in a silane coupling agent solution. As required, agitation of the solution or irradiation of ultrasonic waves to the solution may be used simultaneously. This treatment is generally conducted at a temperature of 20 to 30° C. and for 1 to 10 minutes. Silane coupling agent layer 2 that is formed has a thickness in the range of 10 to 50 nm.

As shown in scheme 1 below, the alkoxyl groups in the silane coupling agent are transformed to silanol groups through hydrolysis with the water component of the aqueous solution or the water-containing solution, and then, the silane coupling agent partially condenses to a state of oligomers. The silane coupling agent in this state adheres strongly through hydrogen bonds with the silanol groups that are produced on the surface of glass substrate 1 in the glass activation treatment S2.

Chemical Formula 1

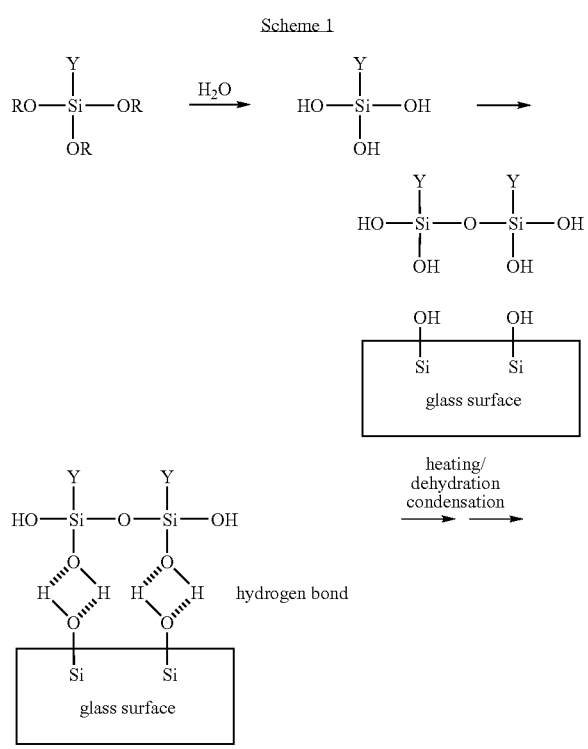

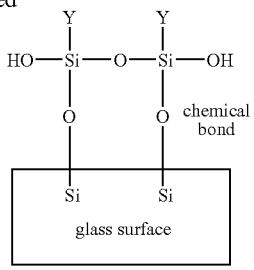

Palladium Catalyst Treatment S4

Next, a palladium catalyst treatment S4 is conducted on glass substrate 1 having silane coupling agent layer 2 formed thereon. The palladium catalyst treatment S4 is carried out by dipping glass substrate 1 in an aqueous solution containing palladium ions of valence 2. Palladium chloride ($PdCl_2$), for example, can be used for an aqueous solution containing palladium ions of valence 2. The reaction between the palladium ion and the N-functional group (amino group, imino group, ureido group, and the like) of the silane coupling agent can be promoted by adding an alkaline compound such as NaOH or KOH into the palladium-containing aqueous solution used in this step. This step is preferably carried out using an aqueous solution containing 0.01 to 1.0 wt % of palladium ions in a $PdCl_2$-converted proportion and 0.01 to 1.0 wt % of alkaline compound in a KOH-converted proportion. This treatment is generally carried out at a temperature in the range of 20 to 30° C. and for 1 to 10 minutes.

This step bonds the palladium ions to the N-functional groups of the silane coupling agent through a coordinate bond or the like, forming palladium catalyst layer 3 that functions as a catalyst for the electroless plating. Palladium catalyst layer 3 that is formed has a thickness of 1 to 10 nm.

Palladium Bonding Treatment S5

Subsequently, a palladium bonding treatment S5 is conducted. This step is preferably carried out by dipping glass substrate 1 having palladium catalyst layer 3 formed thereon into an aqueous solution of hypophosphorous acid ($H_3PO_2$). By the treatment in the aqueous solution of hypophosphorous acid, chlorine dissociates from palladium that forms a complex compound with the chlorine and a strongly bonded condition is established between the amino group of the silane coupling agent and the palladium as a catalyst component. During the process, the excessive free palladium is removed. The aqueous solution of hypophosphorous acid preferably contains 0.1 to 1.0 wt % of hypophosphorous acid. The step is generally carried out at a temperature of 20 to 30° C. and for 1 to 5 minutes.

Electroless Plating S6

Next, a Ni—P electroless plating S6 is conducted on glass substrate 1 on which the palladium bonding treatment S6 has been conducted, forming plating layer 4 of a Ni—P alloy plating film. This step is preferably carried out by dipping glass substrate 1 in an electroless plating solution. Ni—P plating layer 4 that is obtained exhibits various magnetic properties depending on the phosphorus concentration, ranging from soft magnetic (in the case of low phosphorus concentration) to nonmagnetic (in the case of high phosphorus concentration).

This step can use electroless plating solutions with various phosphorus concentrations. Examples of the electroless plating solution include: a nonmagnetic high phosphorus concentration Ni—P plating solution (phosphorus concentration of 10 to 13 wt %; NIMUDEN HDX manufactured by C.Uyemura & Co. Ltd.), from nonmagnetic to soft magnetic medium phosphorus concentration Ni—P plating solutions (phosphorus concentration of 6 to 10 wt %; MELPLATE NI-867 manufactured by Meltex Inc., and phosphorus concentration of 3 to 6 wt %; MELPLATE NI-802 manufactured by Meltex Inc.), and a soft magnetic low phosphorus concentration Ni—P plating solution (phosphorus concentration of 1 to 2 wt %; NIMUDEN LPY manufactured by C.Uyemura & Co. Ltd. and TOP NICORON LPH manufactured by Okuno Chemical Industries Co., Ltd.). This step can further use a commercially available high phosphorus concentration Ni—P electroless plating solution with a phosphorus concentration of more than 14 wt %, which facilitates the precipitation reaction of plating.

This step can be conducted in an appropriate time and at a proper temperature corresponding to a desired thickness of Ni—P plating layer 4. Ni—P plating layer 4 having a thickness of at least 1.0 μm, preferably in the range of 1 μm to 5 μm, can be formed by conducting this step generally at a temperature of 70 to 90° C. and for 10 to 45 minutes.

Heat Treatment S7

Finally, a heat treatment S7 is conducted on glass substrate 1 that has Ni—P plating layer 4. This step improves adhesivity of Ni—P plating layer 4 to glass substrate 1 while maintaining homogeneity of the film thickness and smoothness of the surface of Ni—P plating layer 4. This step actuates the dehydration condensation between the silanol group on the surface of glass substrate 1 in an adhesion condition with a hydrogen bond and the silanol group of the silane coupling agent, and forms a strong chemical bond (covalent bond) between them. Thus, improvement is achieved in the adhesivity between glass substrate 1 and silane coupling agent layer 2, which in turn, improves adhesivity between glass substrate 1 and Ni—P plating layer 4.

The step of heat treatment is preferably carried out at a treatment temperature of 250° C. to 300° C. for at least 1 hour, preferably 2 to 12 hours, more preferably, 3 to 6 hours. Here, fast temperature rise may create stress between glass substrate 1 and Ni—P plating layer 4 due to the difference between the linear expansion coefficient of glass substrate 1 and the linear expansion coefficient of Ni—P plating layer 4, generating defects in Ni—P plating layer 4 such as blisters or cracks. To mitigate the generation of this stress, the temperature rise from room temperature (25° C.) to the treatment temperature in this step is carried out in at least 2 hours, preferably at least 6 hours, more preferably at least 12 hours. That is, the rate of temperature rise in the heating-up process in this step is confined within 135° C./hour, preferably within 40° C./hour, more preferably within 20° C./hour. This step is preferably carried out in an atmosphere of inert gas (for example, nitrogen, helium, or argon) in order to prevent Ni—P plating layer 4 from thermal oxidation due to the heat treatment.

Ni—P plating layer 4 formed by the method of the invention is sufficient to obtain a magnetic disk substrate exhibiting excellent characteristics. A method of the invention forms Ni—P plating layer 4 that has a thickness of at least 1 μm, a homogeneous thickness, highly smooth film surface, and is free from defects of blister, crack, or the like.

More specifically, a Ni—P plating layer 4 according to the invention can be used in the following applications corresponding to the phosphorus concentration. By forming a nonmagnetic high phosphorus concentration Ni—P plating layer on a nonmagnetic glass substrate, many applications are possible including: (a) precise smoothing for high density recording, which is difficult in a high rigidity glass substrate, (b) manufacturing a LZT substrate and an anisotropic alignment medium using tape texturing, and (c) enhancing the coercivity of a magnetic film by applying a bias voltage on a substrate in the sputtering process.

By forming a soft magnetic low phosphorus concentration Ni—P plating film on a nonmagnetic glass substrate, the plating film can be used as a soft magnetic backing layer for a perpendicular magnetic recording medium. A perpendicular magnetic recording medium having a soft magnetic backing layer, called a double layer perpendicular magnetic recording medium, is provided with a soft magnetic backing layer exhibiting high permeability and high saturation magnetic flux density under a magnetic recording layer functioning to record information and facilitates return of magnetic flux generated from a magnetic head, thereby achieving high density recording.

By forming a medium phosphorus concentration Ni—P plating film from nonmagnetic to soft magnetic on a nonmagnetic glass substrate, the plating film is used for an underlayer plating film (strike plating), as an adhesion layer between a low phosphorus concentration Ni—P plating film and the glass substrate, as well as in the above-described application fields of the high phosphorus concentration Ni—P plating film and the low phosphorus concentration Ni—P plating film.

Second Embodiment

The following describes a second embodiment of a method of manufacturing a disk substrate for a perpendicular magnetic recording medium in which plating layer 4 is formed of a soft magnetic Co—Ni—P alloy plating film by electroless plating S6. Since the steps S1 through S5 in this second embodiment are the same as those in the first embodiment described above, only the step of electroless plating S6 and the step of heat treatment S7 are described below.

Plating layer 4 is formed in electroless plating treatment S6 on glass substrate 1 on which a palladium bonding treatment S5 has been conducted. In order to utilize it as a soft magnetic backing layer for perpendicular magnetic recording, plating layer 4 is preferably a soft magnetic plating film composed of a Co—Ni—P alloy containing phosphorus in a range of 3 at % to 20 at % and cobalt of 45 at % in proportion to the number of atoms of cobalt and nickel (Co/(Co+Ni)) and has a thickness in a range of 0.2 μm to 3 μm. The soft magnetic plating film of Co—Ni—P alloy preferably further contains at most 2 at % of tungsten or manganese, since the addition improves corrosion resistance without impairing the function as a soft magnetic backing layer of plating film 4. At most several percent of germanium or lead compound can also be added to stabilize the plating bath without detracting from the effects of the invention.

Soft magnetic plating layer 4 needs a thickness of at least 0.2 μm to function as a soft magnetic backing layer for a perpendicular magnetic recording medium capable of high density recording, while the thickness is desired to be at most 3 μm in view of productivity.

Concerning the composition of soft magnetic plating layer 4, a phosphorus concentration below 3 at % hardly forms a stable electroless plating film, while a phosphorus concentration over 20 at % results in a value of saturation magnetic flux density Bs that is too low, so that the film cannot perform a function as a soft magnetic backing layer. A cobalt concentration lower than 45 at % in proportion to the number of atoms of cobalt and nickel (Co/(Co+Ni)) is not appropriate since the value of saturation magnetic flux density Bs cannot be maintained sufficiently high and the saturation magnetostriction constant becomes negative and a large absolute value. Although an upper limit of the cobalt concentration is not strictly limited to a special value, a cobalt concentration over 90 at % in proportion to the number of atoms of cobalt and nickel (Co/(Co+Ni)) tends to make the CoNi alloy take an hcp structure having a large crystalline magnetic anisotropy constant and to increase coercivity, both unfavorable. The composition preferably contains at least 10 at % of nickel in proportion to the number of atoms of cobalt and nickel (Ni/(Co+Ni)) to stably form an fcc structure.

A heat treatment S7 may be carried out after formation of soft magnetic plating layer 4, although the desired performance can be obtained without the heating process in the plating film of this embodiment of the invention. The heating process scarcely deteriorates the magnetic performances and noise characteristics of soft magnetic plating layer 4 due to magnetic anisotropy induced by the thermal expansion difference between glass substrate 1 and soft magnetic plating layer 4, as long as the relation between the thermal expansion coefficients of glass substrate 1 and plating layer 4, and the saturation magnetostriction constant of soft magnetic plating layer 4 are maintained as described in the above-cited patent documents.

The effects of the invention are preserved when an adhesion layer composed of a nonmagnetic NiP film, for example, is provided between palladium catalyst layer 3 and soft magnetic plating layer 4 on glass substrate 1 to improve the adhesivity.

After forming soft magnetic plating layer 4 by an electroless plating method or after the heat treatment described above, a polishing treatment may be conducted for smoothing the surface of soft magnetic plating layer 4. The surface of soft magnetic plating layer 4 is effectively polished and smoothed using free abrasive. The polishing can be conducted for example, using a double head type buffing machine with polishing pads of urethane foam and feeding the abrasive of suspended aluminum oxide or colloidal silica. After the polishing treatment, a heat treatment may be conducted.

It should be emphasized that the following conditions are important for forming soft magnetic plating layer 4 with excellent adhesivity in the structure formed by the method of the invention shown in FIG. 2 comprising glass substrate 1/silane coupling agent layer 2/palladium catalyst layer 3/Co—Ni—P soft magnetic plating layer 4.

1) Palladium catalyst layer 3 on which the plating layer is deposited is formed with high density.
2) For the above condition 1), silane coupling agent layer 2 disposed beneath palladium catalyst layer 3 is formed with high density.
3) For the above condition 2), plenty of silanol groups (Si—OH) capable of bonding with the silane coupling agent exist on the surface of glass substrate 1.

Therefore, it is essential to attain: good adhesivity of the plating film=high density of the palladium catalyst layer=high density of silane coupling agent layer=high density generation of silanol groups on the surface of the glass substrate. It is the glass activation treatment S2 that increases the number of the silanol groups on the surface of the glass substrate.

FIG. 4 is a graph showing an analysis of the quantity of silanol groups (Si—OH) generated on a surface of a glass substrate after various activation treatments measured by a thermal desorption mass spectroscopy apparatus. Table 1 shows the determined number of the silanol groups.

TABLE 1

Quantity of silanol groups generated following various activation treatments.

| glass activation treatment | determined quantity of Si—OH groups (number of groups per cm$^2$) |
|---|---|
| before treatment | $0.92 \times 10^{15}$ |
| HF → warm water treatment | $1.16 \times 10^{15}$ |
| HF + NH$_4$F treatment | $2.88 \times 10^{15}$ |
| H$_2$SO$_4$ → HF treatment | $4.08 \times 10^{15}$ |

Comparing the quantity of silanol groups on the before treatment surface of the glass substrate, the effect of a glass activation treatment with warm water is slight. On the contrary, the treatment using a mixed solution of HF+NH$_4$F generated about three times the quantity of silanol groups, and the sequential treatments of H$_2$SO$_4$ and HF generated more than four times the quantity of silanol groups. Thus, a significant effect can be expected to improve adhesivity of a plating film by the treatments of the invention.

Figure 3:
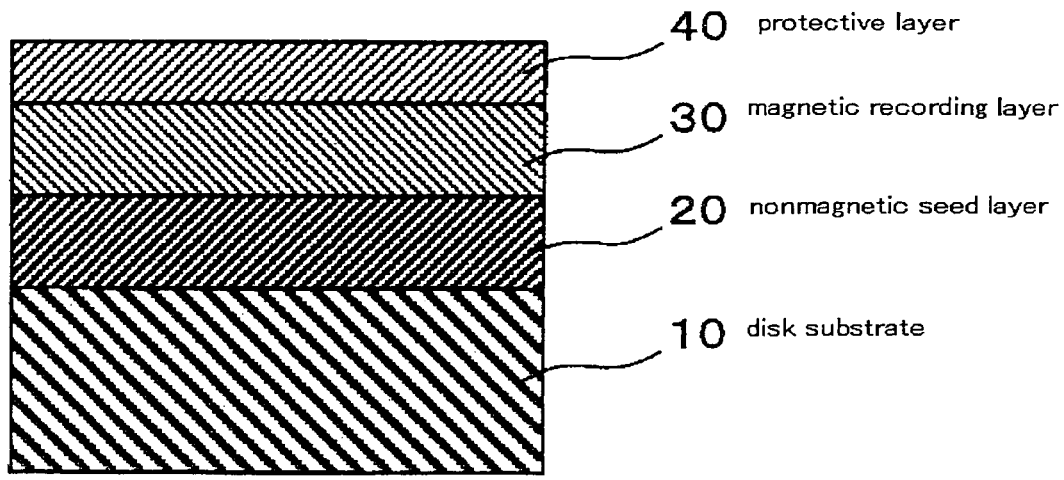
FIG. 3 is a schematic sectional view of a perpendicular magnetic recording medium manufactured by a manufacturing method of an embodiment according to the invention.

Embodiment of a Method of Manufacturing a Perpendicular Magnetic Recording Medium The following describes an embodiment according to the invention of a method of manufacturing a perpendicular magnetic recording medium using a disk substrate for a perpendicular magnetic recording medium manufactured in the second embodiment described above. As shown in FIG. 3, a perpendicular magnetic recording medium manufactured by a manufacturing method of this aspect of invention has a structure comprising at least nonmagnetic seed layer 20, magnetic recording layer 30, and protective layer 40 sequentially formed on disk substrate 10 of FIG. 2 for a perpendicular magnetic recording medium. Though not shown in FIG. 3, nonmagnetic seed layer 20, magnetic recording layer 30, and protective layer 40 can also be formed on the other side of disk substrate 10.

Nonmagnetic seed layer 20 can be composed of a material to control the crystal alignment and the grain size of magnetic recording layer 30 favorably, without any special limitation. When magnetic recording layer 30 is a perpendicular magnetization film composed of a CoCrPt alloy, for example, nonmagnetic seed layer 20 can be composed of a CoCr alloy, titanium or a titanium alloy, or ruthenium or a ruthenium alloy. When magnetic recording layer 30 is a so-called laminated perpendicular magnetization film composed of laminated cobalt alloy layers and platinum or palladium layers, nonmagnetic seed layer 20 can be composed of platinum or palladium. A pre-seed layer or an intermediate layer can be provided on or under nonmagnetic seed layer 20 without obstructing the effects of the invention.

Magnetic recording layer 30 can be composed of any material that allows recording and reproduction in a perpendicular magnetic recording medium. The materials can be selected from the above-mentioned perpendicular magnetization films composed of the CoCrPt alloy, a CoCrPt alloy containing an oxide, or a so-called perpendicular magnetization film comprising layers of a cobalt alloy and platinum or palladium.

Protective layer 40 is a thin film composed mainly of carbon, for example. Protective layer 40 can also be composed of the thin film of mainly carbon and a liquid lubricant layer formed by applying a liquid lubricant such as perfluoropolyether on the carbon thin film.

Nonmagnetic seed layer 20, magnetic recording layer 30, and protective layer 40 can be formed by a thin film formation technique selected from sputtering, CVD, vacuum evaporation, plating, and the like.

A perpendicular magnetic recording medium manufactured as described above has favorable read/write performance as a double layer perpendicular magnetic recording medium since soft magnetic plating layer 4 on disk substrate 10 acts as a soft magnetic backing layer. In addition, the soft magnetic backing layer is formed by an electroless plating method that exhibits high productivity. Therefore, the medium can be manufactured at a very low cost because the backing layer need not be formed by an expensive method of sputtering, for example.

EXAMPLES

Some specific examples of the above-described first and second embodiments according to the invention will be described in the following.

Examples of Ni—P Plated Substrate

Table 2 summarizes the steps of the process for Ni—P plating and main conditions in Examples 1 through 8 that correspond to the above-described first embodiment. Plating layer 4 and other layers were formed on the both sides of glass substrate 1.

TABLE 2

Steps of the process for Ni—P plating and main conditions.

| treatment step | treatment liquid | concentration (wt %) | temperature (° C.) | treatment time (min) |
|---|---|---|---|---|
| (1) detergent degreasing | alkaline detergent | 1.5 | 50 | 3 |
| (2) alkali degreasing | KOH | 7.5 | 50 | 3 |
| (3) glass activation | HF + NH$_4$F | 1.0 + 0.5 | 20 | 3 |
| (4) silane coupling agent treatment | formula (III) or (V) | 1.0 | 20 | 3 |
| (5) palladium catalyst treatment | PdCl$_2$ + NaOH | 1.0 + 0.2 | 20 | 3 |
| (6) palladium bonding treatment | H$_3$PO$_2$ | 1.0 | 20 | 3 |
| (7) Ni—P electroless plating | NIMUDEN HDX | | 80 | 20 |
| | Melplate NI-867 | | 70 | 35 |
| | NIMUDEN LPY | | 80 | 25 |
| (8) heat treatment | 30° C. → (12 hr or 2 hr) → 250° C. (4 hr) → (12 hr or 2 hr) → 30° C. in N$_2$ gas | | | |

Example 1

A chemically strengthened amorphous glass plate of boron aluminosilicate (Ra=0.25 nm) was used for glass substrate 1. Ni—P plating layer 4 was formed by sequentially conducting the following steps (1) through (8).
 (1) Detergent degreasing: A treatment was carried out by dipping in an aqueous solution of alkaline detergent with a concentration of 1.5 wt % at a temperature of 50° C. for 3 minutes.
 (2) Alkali degreasing: A treatment was carried out by dipping in an aqueous solution of KOH with a concentration of 7.5 wt % at a temperature of 50° C. for 3 minutes.
 (3) Glass activation: A treatment was carried out by dipping in a mixed aqueous solution of HF (with a concentration of 1.0 wt %) and NH$_4$F (with a concentration of 0.5 wt %) at a temperature of 20° C. for 3 minutes.
 (4) Silane coupling agent treatment: A treatment was carried out by dipping in an aqueous solution of 3-aminopropyl triethoxysilane (a compound of Formula (III)) with a concentration of 1.0 wt % at a temperature of 20° C. for 3 minutes.
 (5) Palladium catalyst treatment: A treatment was carried out by dipping in a mixed aqueous solution of PdCl$_2$ (with a concentration of 1.0 wt %) and NaOH (with a concentration of 0.2 wt %) at a temperature of 20° C. for 3 minutes.
 (6) Palladium bonding treatment: A treatment was carried out by dipping in an aqueous solution of H$_3$PO$_2$ with a concentration of 1.0 wt % at a temperature of 20° C. for 3 minutes.
 (7) Ni—P electroless plating: A Ni—P plating layer having a thickness of 3.0 μm was formed by a treatment of dipping in a plating solution "NIMUDEN HDX (with a phosphorus concentration of from 10 to 13 wt %)" (manufactured by C.Uyemura & Co. Ltd.) at a temperature of 80° C. for 20 minutes.
 (8) Heat treatment: Temperature was increased from 30° C. to 250° C. in 12 hours, held at 250° C. for 4 hours, and decreased to 30° C. in 12 hours. (Both rising and falling rates of the temperature were 18.3° C./hour.)

Example 2

A Ni—P plating layer was formed in the same procedure as in Example 1 except that the step (7) in Example 1 was replaced by the step (7B) below.
 (7B) A Ni—P plating layer having a thickness of 3.0 μm was formed by a treatment of dipping in a plating solution "Melplate NI-867 (with a phosphorus concentration of from 6 to 8 wt %)" (manufactured by Meltex Inc.) at a temperature of 70° C. for 35 minutes.

Example 3

A Ni—P plating layer was formed in the same procedure as in Example 1 except that the step (7) in Example 1 was replaced by the step (7C) below.
 (7C) A Ni—P plating layer having a thickness of 3.0 μm was formed by a treatment of dipping in a plating solution "NIMUDEN LPY (with a phosphorus concentration of from 1 to 2 wt %)" (manufactured by C.Uyemura & Co. Ltd.) at a temperature of 80° C. for 25 minutes.

Example 4

A Ni—P plating layer was formed in the same procedure as in Example 1 except that the step (4) in Example 1 was replaced by the step (4B) below.

(4B) A treatment was carried out by dipping in an aqueous solution of N-(2-aminoethyl)-3-aminopropyl triethoxysilane (a compound of Formula (V)) with a concentration of 1.0 wt % at a temperature of 20° C. for 3 minutes.

Example 5

A Ni—P plating layer was formed in the same procedure as in Example 2 except that the step (4) in Example 2 was replaced by the step (4B) described in Example 4.

Example 6

A Ni—P plating layer was formed in the same procedure as in Example 3 except that the step (4) in Example 3 was replaced by the step (4B) described in Example 4.

Example 7

A Ni—P plating layer was formed in the same procedure as in Example 3 except that the step (8) in Example 3 was replaced by the step (8B) below.
(8B) Temperature was increased from 30° C. to 250° C. in 2 hours, held at 250° C. for 4 hours, and decreased to 30° C. in 2 hours. (Both rising and falling rates of the temperature were 110° C./hour.)

Example 8

A Ni—P plating layer was formed in the same procedure as in Example 6 except that the step (8) in Example 6 was replaced by the step (8B) described in Example 7.

Comparative Example 1

A chemically strengthened amorphous glass plate of boron aluminosilicate (Ra=0.25 nm) was used for glass substrate 1. A Ni—P plating layer was formed by sequentially conducting the following steps (9) through (15).
(9) Detergent degreasing: A treatment was carried out by dipping in an aqueous solution of alkaline detergent with a concentration of 1.5 wt % at a temperature of 50° C. for 3 minutes.
(10) Alkali degreasing: A treatment was carried out by dipping in an aqueous solution of KOH with a concentration of 7.5 wt % at a temperature of 50° C. for 3 minutes.
(11) Glass surface coarsening: A treatment was carried out by dipping in a mixed aqueous solution of chromic acid (with a concentration of 40 wt %) and sulfuric acid (with a concentration of 40 wt %) at a temperature of 60° C. for 10 minutes.
(12) Catalyst treatment providing with a catalyst: A treatment was carried out by dipping in a mixed aqueous solution of $PdCl_2$ (with a concentration of 0.3 g/L), $SnCl_2$-$2H_2O$ (with a concentration of 15 g/L), and 36% HCl (with a concentration of 200 mL/L) at a temperature of 20° C. for 3 minutes.
(13) Acceleration treatment providing with a catalyst: A treatment was carried out by dipping in an aqueous solution of $H_2SO_4$ with a concentration of 100 g/L at a temperature of 50° C. for 5 minutes.
(14) Ni—P electroless plating: A Ni—P plating layer having a thickness of 0.4 μm was formed by a treatment of dipping in a plating solution "NIMUDEN HDX (with a phosphorus concentration of from 10 to 13 wt %)" (manufactured by C.Uyemura & Co. Ltd.) at a temperature of 80° C. for 3.0 minutes. (A thickness more than 0.4 μm was impossible due to occurrence of peeling of a film during the plating process.)
(15) Heat treatment: Temperature was held at 250° C. for 4 hours under an atmosphere of nitrogen gas.

Comparative Example 2

A Ni—P plating layer was formed in the same procedure as in Comparative Example 1 except that the step (14) in Comparative Example 1 was replaced by the step (14B) below.
(14B) A Ni—P plating layer having a thickness of 0.7 μm was formed by a treatment of dipping in a plating solution "Melplate NI-867 (with a phosphorus concentration of from 6 to 8 wt %)" (manufactured by Meltex Inc.) at a temperature of 80° C. for 9 minutes. (A thickness more than 0.7 μm was impossible due to occurrence of peeling of a film during the plating process.)

Comparative Example 3

A Ni—P plating layer was formed in the same procedure as in Comparative Example 1 except that the step (14) in Comparative Example 1 was replaced by the step (14C) below.
(14C) A Ni—P plating layer having a thickness of 0.5 μm was formed by a treatment of dipping in a plating solution "NIMUDEN LPY (with a phosphorus concentration of from 1 to 2 wt %)" (manufactured by C. Uyemura & Co. Ltd.) at a temperature of 80° C. for 3.0 minutes. (A thickness more than 0.5 μm was impossible due to occurrence of peeling of a film during the plating process.)

Comparative Example 4

A Ni—P plating layer was formed in the same procedure as in Example 1 except that the step (8) in Example 1 was replaced by the step (8C) below.
(8C) Heat treatment: Temperature was increased from 30° C. to 250° C. in 1 hour, held at 250° C. for 4 hours, and decreased to 30° C. in 1 hour. (Both rising and falling rates of the temperature were 220° C./hour.)

Comparative Example 5

A Ni—P plating layer was formed in the same procedure as in Example 2 except that the step (8) in Example 2 was replaced by the step (8C) described in Comparative Example 4.

Comparative Example 6

A Ni—P plating layer was formed in the same procedure as in Example 3 except that the step (8) in Example 3 was replaced by the step (8C) described in Comparative Example 4.

Evaluation

On each glass substrate having a Ni—P plating film formed by an electroless plating process obtained in the Examples 1 through 8 and Comparative Examples 1 through 6, evaluation of blistering of the Ni—P plating layer was conducted by the observation by an optical microscope (magnification: ×50) and the adhesivity was evaluated by the cross-cut peeling test (JIS (Japanese Industrial Standards) K5600-3-4). In addition, the average roughness Ra after plating was evaluated by surface roughness measurement using an atomic force microscope (AFM). The results of the evaluations are shown in Table 3.

TABLE 3

Evaluations of thickness, adhesivity, and surface roughness of the Ni—P plating film

| | coupling agent *1 | plating layer *2 | thickness of plating layer (μm) | heating condition | blistering | adhesivity *3 | surface roughness Ra (nm) |
|---|---|---|---|---|---|---|---|
| Ex 1 | formula (III) | HDX | 3.0 | (8) | unobserved | ○ | 0.32 |
| Ex 2 | formula (III) | NI-867 | 3.0 | (8) | unobserved | ○ | 0.33 |
| Ex 3 | formula (III) | LPY | 3.0 | (8) | unobserved | ○ | 0.32 |
| Ex 4 | formula (V) | HDX | 3.0 | (8) | unobserved | ○ | 0.33 |
| Ex 5 | formula (V) | NI-867 | 3.0 | (8) | unobserved | ○ | 0.33 |
| Ex 6 | formula (V) | LPY | 3.0 | (8) | unobserved | ○ | 0.32 |
| Ex 7 | formula (III) | LPY | 3.0 | (8B) | unobserved | ○ | 0.34 |
| Ex 8 | formula (V) | LPY | 3.0 | (8B) | unobserved | ○ | 0.33 |
| Comp Ex 1 | Sn/Pd | HDX | 0.4 | (15) | observed | X | 0.52 |
| Comp Ex 2 | Sn/Pd | NI-867 | 0.7 | (15) | observed | X | 0.68 |
| Comp Ex 3 | Sn/Pd | LPY | 0.5 | (15) | observed | X | 0.57 |
| Comp Ex 4 | formula (III) | HDX | 3.0 | (8C) | observed | X | 0.32 |
| Comp Ex 5 | formula (III) | NI-867 | 3.0 | (8C) | observed | X | 0.34 |
| Comp Ex 6 | formula (III) | LPY | 3.0 | (8C) | observed | X | 0.32 |

*1 Compound of formula (III): 3-aminopropyl triethoxysilane Compound of formula (V): N-(2-aminoethyl)-3-aminopropyl triethoxysilane
*2 HDX: NIMUDEN HDX (manufactured by C. Uyemura & Co., Ltd.) NI-867: Melplate NI-867 (manufactured by Meltex Inc.) LPY: NIMUDEN LPY (manufactured by C. Uyemura & Co., Ltd.)
*3 ○: peeling occurred in none out of ten samples, X: peeling occurred in at least one sample out of ten samples.

As is apparent from the results in Examples 1 through 8 in Table 3, a thickness of 3.0 μm has been attained in a Ni—P plating films of from low phosphorus concentration to high phosphorus concentration employing a method of the invention. The electroless Ni—P plating film obtained by the method of the invention does not generate blister defects, and exhibits excellent adhesivity. The surface of the Ni—P plating layer that is obtained has an approximately equal surface roughness to the surface roughness of the substrate (Ra=0.25 nm) and the value is within the level of the surface roughness that is required by a substrate of a hard disk.

In contrast, Comparative Examples 1 through 3 according to a known method using catalysts of tin (II) chloride and palladium (see Japanese Unexamined Patent Application Publication No. S48-85614) provided a Ni—P plating layer having a thickness of only in a range of 0.4 to 0.7 μm, and a Ni—P plating layer having a thickness of not less than 1.0 μm can not be obtained. The resulting Ni—P plating layer has blister defects, exhibits significantly degraded adhesivity with a glass substrate, and has a large surface roughness.

Comparative Examples 4 through 6 with increased rising and falling rates of temperature generated blisters in the Ni—P plating layer due to the stress caused by the difference between the linear expansion coefficients of the glass substrate and the Ni—P plating film during the heat treatment. The adhesivity of the Ni—P plating layer with the glass substrate was also significantly degraded.

Examples of Co—Ni—P Plated Substrate

Table 4 summarizes the steps of the process for Co—Ni—P plating and main conditions in Examples 9 through 18 that correspond to the above-described second embodiment. The plating layer 4 and other layers were formed on the both sides of the glass substrate 1.

TABLE 4

Steps of the process for Co—Ni—P plating and main conditions

| | treatment step | treatment liquid | concentration | temperature (° C.) | treatment time (min) |
|---|---|---|---|---|---|
| (1) | detergent degreasing | alkaline detergent | 1.5 wt % | 50 | 3 |
| (2) | alkali degreasing | KOH | 7.5 wt % | 50 | 3 |
| (3) | glass activation | $H_2SO_4 \rightarrow HF$, $HCl \rightarrow HF$, or $HF + NH_4F$ | various | 20 | 3 |
| (4) | silane coupling agent treatment | formula (III) or (V) | 1.0 wt % | 20 | 3 |
| (5) | palladium catalyst treatment | $PdCl_2$ + NaOH | 1.0 + 0.2 wt % | 20 | 3 |
| (6) | palladium bonding treatment | $H_3PO_2$ | 1.0 wt % | 20 | 3 |
| (7) | Co—Ni—P electroless plating | nickel sulfate | 10 g/L | 90 | 75 |
| | | cobalt sulfate | 10 g/L | | |
| | | sodium hypophosphite | 20 g/L | | |
| | | sodium citrate | 60 g/L | | |
| | | boric acid | 30 g/L | | |
| (8) | heat treatment | | 100° C., 6 hr, in $N_2$ gas atmosphere | | |

Example 9

A chemically strengthened amorphous glass plate of boron aluminosilicate (Ra=0.25 nm) was used for glass substrate 1. A Co—Ni—P plating layer 4 was formed by sequentially conducting the following steps (1) through (8).
- (1) Detergent degreasing: A treatment was carried out by dipping in an aqueous solution of alkaline detergent with a concentration of 1.5 wt % at a temperature of 50° C. for 3 minutes.
- (2) Alkali degreasing: A treatment was carried out by dipping in an aqueous solution of KOH with a concentration of 7.5 wt % at a temperature of 50° C. for 3 minutes.
- (3) Glass activation: A treatment was carried out by dipping in an aqueous solution of $H_2SO_4$ with a concentration of 1.0 wt % at a temperature of 20° C. for 3 min. and subsequently dipping in an aqueous solution of HF with a concentration of 1.0 wt % at a temperature of 20° C. for 3 minutes.
- (4) Silane coupling agent treatment: A treatment was carried out by dipping in an aqueous solution of 3-aminopropyl triethoxysilane (a compound of Formula (III)) with a concentration of 1.0 wt % at a temperature of 20° C. for 3 minutes.
- (5) Palladium catalyst treatment: A treatment was carried out by dipping in a mixed aqueous solution of $PdCl_2$ (with a concentration of 1.0 wt %) and NaOH (with a concentration of 0.2 wt %) at a temperature of 20° C. for 3 minutes.
- (6) Palladium bonding treatment: A treatment was carried out by dipping in an aqueous solution of $H_3PO_2$ with a concentration of 1.0 wt % at a temperature of 20° C. for 3 minutes.
- (7) Co—Ni—P electroless plating: A Co—Ni—P plating layer having a thickness of 3.0 μm was formed by a treatment of dipping in a plating bath having a composition consisting of
  1) metallic component: nickel sulfate: 10 g/L,
  2) metallic component: cobalt sulfate: 10 g/L
  3) reducing agent: sodium hypophosphite: 20 g/L
  4) complexing agent: sodium citrate: 60 g/L
  5) buffer reagent: boric acid: 30 g/L at a temperature of 90° C. for 75 minutes.
- (8) Heat treatment: A heat treatment was carried out by heating at 100° C. for 6 hours in nitrogen gas atmosphere.

Example 10

A Co—Ni—P plating layer was formed in the same procedure as in Example 9 except that the step (3) in Example 9 was replaced by the step (3B) below.
- (3B) A treatment was carried out by dipping in an aqueous solution of HCl with a concentration of 1.0 wt % at a temperature of 20° C. for 3 minutes, and subsequently dipping in an aqueous solution of HF with a concentration of 1.0 wt % at a temperature of 20° C. for 3 minutes.

Example 11

A Co—Ni—P plating layer was formed in the same procedure as in Example 9 except that the step (3) in Example 9 was replaced by the step (3C) below.
- (3C) A treatment was carried out by dipping in an aqueous solution of $H_2SO_4$ with a concentration of 1.0 wt % at a temperature of 20° C. for 3 minutes, and subsequently dipping in an aqueous solution of HF with a concentration of 0.05 wt % at a temperature of 20° C. for 3 minutes.

Example 12

A Co—Ni—P plating layer was formed in the same procedure as in Example 9 except that the step (3) in Example 9 was replaced by the step (3D) below.
- (3D) A treatment was carried out by dipping in an aqueous solution of HCl with a concentration of 1.0 wt % at a temperature of 20° C. for 3 minutes, and subsequently dipping in an aqueous solution of HF with a concentration of 0.05 wt % at a temperature of 20° C. for 3 minutes.

Example 13

A Co—Ni—P plating layer was formed in the same procedure as in Example 9 except that the step (3) in Example 9 was replaced by the step (3E) below.
- (3E) A treatment was carried out by dipping in a mixed aqueous solution of HF (with a concentration of 1.0 wt %) and $NH_4F$ (with a concentration of 0.5 wt %) at a temperature of 20° C. for 3 minutes.

Example 14

A Co—Ni—P plating layer was formed in the same procedure as in Example 9 except that the step (4) in Example 9 was replaced by the step (4B) below.
- (4B) A treatment was carried out by dipping in an aqueous solution of N-(2-aminoethyl)-3-aminopropyl triethoxysilane (a compound of Formula (V)) with a concentration of 1.0 wt % at a temperature of 20° C. for 3 minutes.

Example 15

A Co—Ni—P plating layer was formed in the same procedure as in Example 10 except that the step (4) in Example 10 was replaced by the step (4B) described in Example 14.

Example 16

A Co—Ni—P plating layer was formed in the same procedure as in Example 11 except that the step (4) in Example 11 was replaced by the step (4B) described in Example 14.

Example 17

A Co—Ni—P plating layer was formed in the same procedure as in Example 12 except that the step (4) in Example 12 was replaced by the step (4B) described in Example 14.

Example 18

A Co—Ni—P plating layer was formed in the same procedure as in Example 13 except that the step (4) in Example 13 was replaced by the step (4B) described in Example 14.

Comparative Example 7

A chemically strengthened amorphous glass plate of boron aluminosilicate (Ra=0.25 nm) was used for a glass substrate 1. Co—Ni—P plating layer 4 was formed by sequentially conducting the following steps (9) through (15).

(9) Detergent degreasing: A treatment was carried out by dipping in an aqueous solution of alkaline detergent with a concentration of 1.5 wt % at a temperature of 50° C. for 3 minutes.
(10) Alkali degreasing: A treatment was carried out by dipping in an aqueous solution of KOH with a concentration of 7.5 wt % at a temperature of 50° C. for 3 minutes.
(11) Glass surface coarsening: A treatment was carried-out by dipping in a mixed aqueous solution of chromic acid (with a concentration of 40 wt %) and sulfuric acid (with a concentration of 40 wt %) at a temperature of 60° C. for 10 minutes.
(12) Catalyst treatment providing a catalyst: A treatment was carried out by dipping in a mixed aqueous solution of $PdCl_2$ (with a concentration of 0.3 g/L), $SnCl_2\text{-}2H_2O$ (with a concentration of 15 g/L), and 36% HCl (with a concentration of 200 mL/L) at a temperature of 20° C. for 3 minutes.
(13) Acceleration treatment providing a catalyst: A treatment was carried out by dipping in an aqueous solution of $H_2SO_4$ with a concentration of 100 g/L at a temperature of 50° C. for 5 minutes.
(14) Co—Ni—P electroless plating: A Co—Ni—P plating layer having a thickness of 0.5 μm was formed by a treatment of dipping in a plating bath having a composition described in (7) of Example 9 at a temperature of 90° C. for 12.5 minutes. (A thickness more than 0.5 μm was impossible due to occurrence of peeling of a film during the plating process.)
(15) Heat treatment on a Co—Ni—P plating layer: A heat treatment was carried out by heating at 100° C. for 6 hr in nitrogen gas atmosphere.

Comparative Example 8

A Co—Ni—P plating layer was formed in the same procedure as in Example 9 except that the step (3) in Example 9 was replaced by the step (3F) below.
(3F) A treatment was carried out by dipping in an aqueous solution of HF with a concentration of 1.0 wt % at a temperature of 20° C. for 3 minutes and subsequently in warm water at a temperature of 90° C. for 3 minutes.

Comparative Example 9

A Co—Ni—P plating layer was formed in the same procedure as in Example 9 except that the step (3) in Example 9 was replaced by the step (3G) below.
(3G) A treatment was carried out by dipping in an aqueous solution of $H_2SO_4$ with a concentration of 1.0 wt % at a temperature of 20° C. for 3 minutes and subsequently in an aqueous solution of HF with a concentration of 2.0 wt % at a temperature of 20° C. for 3 minutes.

Comparative Example 10

A Co—Ni—P plating layer was formed in the same procedure as in Example 9 except that the step (3) in Example 9 was replaced by the step (3H) below.
(3H) A treatment was carried out by dipping in an aqueous solution of HCl with a concentration of 1.0 wt % at a temperature of 20° C. for 3 minutes and subsequently in an aqueous solution of HF with a concentration of 2.0 wt % at a temperature of 20° C. for 3 minutes.

Evaluation

On each glass substrate having a Co—Ni—P plating film formed by an electroless plating process obtained in the Examples 9 through 18 and Comparative Examples 7 through 10, evaluation of blistering of the Co—Ni—P plating layer was conducted by observation with an optical microscope (magnification: ×50) and the adhesivity was evaluated by the cross-cut peeling test (JIS (Japanese Industrial Standards) K5600-3-4). In addition, the average roughness Ra after plating was evaluated by surface roughness measurement using an atomic force microscope (AFM). Further, the quantity of silanol groups (Si—OH) generated on a surface of a glass substrate after activation treatment was measured by a thermal desorption mass spectroscopy apparatus. The results of these evaluations are shown in Table 5.

TABLE 5

Evaluation of thickness, adhesivity, and surface roughness of the Co—Ni—P plating film

|  | coupling agent *1 | glass activation treatment | quantity of Si—OH (groups/cm$^2$) | thickness of plating layer (μm) | blistering | adhesivity *2 | surface roughness Ra (nm) |
|---|---|---|---|---|---|---|---|
| Ex 9 | formula (III) | 1 wt % $H_2SO_4$ → 1 wt % HF | 3.45 × 10$^{15}$ | 3.0 | unobserved | ○ | 0.35 |
| Ex 10 | formula (III) | 1 wt % HCl → 1 wt % HF | 3.32 × 10$^{15}$ | 3.0 | unobserved | ○ | 0.32 |
| Ex 11 | formula (III) | 1 wt % $H_2SO_4$ → 0.05 wt % HF | 4.01 × 10$^{15}$ | 3.0 | unobserved | ○ | 0.39 |
| Ex 12 | formula (III) | 1 wt % HCl → 0.05 wt % HF | 3.88 × 10$^{15}$ | 3.0 | unobserved | ○ | 0.40 |
| Ex 13 | formula (III) | 1 wt % HF + 0.5 wt % $NH_4F$ | 2.81 × 10$^{15}$ | 3.0 | unobserved | ○ | 0.30 |
| Ex 14 | formula (V) | 1 wt % $H_2SO_4$ → 1 wt % HF | 3.65 × 10$^{15}$ | 3.0 | unobserved | ○ | 0.33 |
| Ex 15 | formula (V) | 1 wt % HCl → 1 wt % HF | 3.48 × 10$^{15}$ | 3.0 | unobserved | ○ | 0.32 |
| Ex 16 | formula (V) | 1 wt % $H_2SO_4$ → 0.05 wt % HF | 4.08 × 10$^{15}$ | 3.0 | unobserved | ○ | 0.36 |
| Ex 17 | formula (V) | 1 wt % HCl → 0.05 wt % HF | 3.98 × 10$^{15}$ | 3.0 | unobserved | ○ | 0.37 |
| Ex 18 | formula (V) | 1 wt % HF + 0.5 wt % $NH_4F$ | 2.88 × 10$^{15}$ | 3.0 | unobserved | ○ | 0.30 |

TABLE 5-continued

Evaluation of thickness, adhesivity, and surface roughness of the Co—Ni—P plating film

|  | coupling agent *1 | glass activation treatment | quantity of Si—OH (groups/cm$^2$) | thickness of plating layer (μm) | blistering | adhesivity *2 | surface roughness Ra (nm) |
|---|---|---|---|---|---|---|---|
| Comp Ex 7 | Sn/Pd | — | $0.91 \times 10^{15}$ | 0.5 | observed | X | 0.72 |
| Comp Ex 8 | formula (III) | 1 wt % HF + 90° C. warm water | $1.16 \times 10^{15}$ | 3.0 | unobserved | X | 0.35 |
| Comp Ex 9 | formula (III) | 1 wt % H$_2$SO$_4$ → 2 wt % HF | $1.56 \times 10^{15}$ | 3.0 | unobserved | X | 0.31 |
| Comp Ex 10 | formula (III) | 1 wt % HCl → 2 wt % HF | $1.41 \times 10^{15}$ | 3.0 | unobserved | X | 0.30 |

*1 Compound of formula (III): 3-aminopropyl triethoxysilane Compound of formula (V): N-(2-aminoethyl)-3-aminopropyltriethoxysilane
*2 ◯: peeling occurred in none out of ten samples X: peeling occurred in at lest one sample out of ten samples.

As is apparent from the results in Examples 9 through 18 in Table 5, a thickness of 3.0 μm has been attained in Co—Ni—P electroless plating films on a glass substrate employing a method of the invention. The Co—Ni—P plating layer obtained by the method of the invention does not generate blister defects, and exhibits excellent adhesivity. The surface of the obtained Co—Ni—P plating layer has an approximately equal surface roughness to the surface roughness of the substrate (Ra=0.25 nm) and the value is retained within a level of the surface roughness that is required by a substrate of a hard disk.

A method of the invention is applied not only to form a Co—Ni—P plating layer. The method also allows formation of soft magnetic layers of Ni—P, Ni—Fe—P, Co—Ni—Fe—P, and the like that can be formed on a glass substrate by an electroless plating method with a necessary and sufficient thickness (in the range of 1 μm to 3 μm) and satisfactory adhesivity, homogeneity, and smoothness for obtaining a hard disk of excellent characteristics.

In contrast, Comparative Example 7 according to a known method using catalysts of tin (II) chloride and palladium (see Japanese Unexamined Patent Application Publication No. S48-85614) provided a Co—Ni—P plating layer having a thickness of only 0.5 μm, and a Co—Ni—P plating layer having a thickness of not less than 1.0 μm can not be obtained. The obtained Co—Ni—P plating layer has blister defects, exhibits significantly degraded adhesivity with a glass substrate, and has a large surface roughness.

As is apparent from Comparative Examples 8, 9, and 10, when the quantity of the silanol groups (Si—OH) generated on the glass substrate surface by a glass activation treatment is improper, the adhesivity with the silane coupling agent degrades, even if all the steps except for the step of glass activation treatment are unaltered. As a result, the adhesivity of the Co—Ni—P plating layer with the glass substrate also degrades.

Examples of Embodiment of a Method of Manufacturing a Perpendicular Magnetic Recording Medium The following describes Examples 19 through 28 in which the layers shown in FIG. 3 including a magnetic recording layer 30 are provided on the both sides of a disk substrate 10 for a perpendicular magnetic recording medium obtained in the above-described Examples 9 through 18.

Example 19

Disk substrate 10 for a perpendicular magnetic recording medium obtained in Example 9 described above was polished with an abrasive of colloidal silica using a double head type buffing machine having polishing pads of urethane foam. After cleaning the surface with fine rinsing, the substrate was introduced into a sputtering apparatus. After heating the substrate by a lamp heater for 10 seconds to reach a surface temperature of 200° C., deposited on the substrate surface were nonmagnetic seed layer 20 of titanium with a thickness of 10 nm using a titanium target, subsequently magnetic recording layer 30 of a CoCrPt alloy with a thickness of 30 nm using a target of Co$_{70}$Cr$_{20}$Pt$_{10}$, and finally protective layer 40 of carbon nm thick using a carbon target. Then, the substrate with the layers was taken out from the vacuum chamber. All these deposition processes by sputtering were conducted by a DC magnetron sputtering method under an argon gas pressure of 5 mTorr. After that, a liquid lubricant layer 2 nm thick was formed of perfluoropolyether by a dipping method, to produce a perpendicular magnetic recording medium of FIG. 3.

Example 20

A perpendicular magnetic recording medium as shown in FIG. 3 was manufactured in the same procedure as in Example 19 except that disk substrate 10 for a perpendicular magnetic recording medium obtained in Example 10 described above was used.

Example 21

A perpendicular magnetic recording medium as shown in FIG. 3 was manufactured in the same procedure as in Example 19 except that disk substrate 10 for a perpendicular magnetic recording medium obtained in Example 11 described above was used.

Example 22

A perpendicular magnetic recording medium as shown in FIG. 3 was manufactured in the same procedure as in Example 19 except that disk substrate 10 for a perpendicular magnetic recording medium obtained in Example 12 described above was used.

Example 23

A perpendicular magnetic recording medium as shown in FIG. 3 was manufactured in the same procedure as in Example 19 except that disk substrate 10 for a perpendicular magnetic recording medium obtained in Example 13 described above was used.

Example 24

A perpendicular magnetic recording medium as shown in FIG. 3 was manufactured in the same procedure as in Example 19 except that disk substrate 10 for a perpendicular magnetic recording medium obtained in Example 14 described above was used.

Example 25

A perpendicular magnetic recording medium as shown in FIG. 3 was manufactured in the same procedure as in Example 19 except that disk substrate 10 for a perpendicular magnetic recording medium obtained in Example 15 described above was used.

Example 26

A perpendicular magnetic recording medium as shown in FIG. 3 was manufactured in the same procedure as in Example 19 except that disk substrate 10 for a perpendicular magnetic recording medium obtained in Example 16 described above was used.

Example 27

A perpendicular magnetic recording medium as shown in FIG. 3 was manufactured in the same procedure as in Example 19 except that disk substrate 10 for a perpendicular magnetic recording medium obtained in Example 17 described above was used.

Example 28

A perpendicular magnetic recording medium as shown in FIG. 3 was manufactured in the same procedure as in Example 19 except that disk substrate 10 for a perpendicular magnetic recording medium obtained in Example 18 described above was used.

Evaluation

On the perpendicular magnetic recording media manufactured in Examples 19 through 28, the reproduced signal outputs were measured at a recording density of 300 kFCI (flux change per inch) using a spinning stand tester equipped with a single magnetic pole type magnetic head for a perpendicular magnetic recording medium. After direct current demagnetization of the medium at a write current of 50 mA, the noises generated from the soft magnetic backing layer of soft magnetic plating layer 4 were measured from the detected reproduction output. The reproduction output in this measurement is detected in the condition in which the magnetization in the magnetic recording layer 30 orients in one direction by the dc demagnetization. Consequently, the detected noises can be deemed mostly generated from soft magnetic plating layer 4. In the next evaluation, the spike noises were measured using a spinning stand tester equipped with a single magnetic pole type magnetic head for a perpendicular magnetic recording medium. In the first of the measurement, dc demagnetization of the perpendicular magnetic recording medium was carried out by supplying the writing element of the magnetic head with the dc current of 50 mA. Then, the current in the writing element was decreased to zero and the signal generated from the perpendicular magnetic recording medium was read out without writing-in. The results are shown in Table.6.

TABLE 6

Evaluation of reproduced output signal, noises from soft magnetic layer, and spike noise

| | reproduced output at write current of 20-60 mA (mV) | noise measurement: reproduced output after dc demagnetization (mVpp) | generation of spike noises |
|---|---|---|---|
| Example 19 | 0.92-0.98 | 0.25 | ○ |
| Example 20 | 0.91-0.98 | 0.27 | ○ |
| Example 21 | 0.90-0.97 | 0.24 | ○ |
| Example 22 | 0.89-0.95 | 0.25 | ○ |
| Example 23 | 0.94-0.99 | 0.29 | ○ |
| Example 24 | 0.86-0.95 | 0.20 | ○ |
| Example 25 | 0.86-0.94 | 0.21 | ○ |
| Example 26 | 0.84-0.91 | 0.21 | ○ |
| Example 27 | 0.85-0.98 | 0.19 | ○ |
| Example 28 | 0.93-0.99 | 0.28 | ○ |
| specification | 0.80-1.00 | <0.30 | ○ |

○ indicates generation of no spike noise

All perpendicular magnetic recording media of Examples 19 through 28 showed that satisfactory reproduction output was obtained with a low write current and the output was saturated in the range of 20-60 mA, demonstrating the media are favorable for practical application. It has also been demonstrated that the media generate little noises from the soft magnetic plating layer without generation of spike noises, are desirable perpendicular magnetic recording media.

As described so far, a Co—Ni—P plating layer has been formed on a glass substrate by an electroless plating method, the plating layer having satisfactory thickness, adhesivity and homogeneity and exhibiting sufficient smoothness that are required by a soft magnetic backing layer to obtain a perpendicular magnetic recording medium achieving excellent read/write characteristics.

Thus, a method of manufacturing a disk substrate for a magnetic recording medium has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. A method of electroless plating on a glass base plate, the method comprising a series of treatments on a surface of a base plate composed of a glass material, the series of treatments including, in order, at least:
   glass activation treatment to increase quantity of silanol groups on the surface of the base plate at least by a factor of two using an aqueous solution of diluted acid,
   silane coupling agent treatment,
   palladium catalyst treatment,
   palladium bonding treatment;
   formation of a plating film by means of an electroless plating method,
   wherein the glass activation treatment is a treatment using sulfuric acid, nitric acid, or a hydrochloric acid of 0.1 wt % to 10 wt % followed by a treatment using hydrofluoric acid of 0.0001 wt % to 1 wt %
   wherein the silane coupling agent treatment immediately follows the glass activation treatment.

2. The method of plating on a glass base plate according to claim 1, wherein the silane coupling agent treatment comprises a treatment using a silane coupling agent having a structure represented by a general formula (I):

$$(C_mH_{2m+1}O)_3Si(CH_2)_nNHR \qquad (I)$$

where R is selected from H, $C_pH_{2p}NH_2$, $CONH_2$, and $C_6H_5$, and each of m, n, and p represents a positive integer.

3. The method of plating on a glass base plate according to claim 1, wherein the palladium catalyst treatment comprises a treatment using a mixed solution of palladium chloride and diluted sodium hydroxide or a mixed solution of palladium chloride and diluted potassium hydroxide.

4. The method of plating on a glass base plate according to claim 1, wherein the palladium bonding treatment comprises treatment using an aqueous solution of hypophosphorous acid.

5. The method of plating on a glass base plate according to claim 1, wherein surface roughness Ra of the glass base plate is at most 0.5 nm.

6. The method of plating on a glass base plate according to claim 1, wherein a plating film composed of a Ni—P alloy is formed by means of the electroless plating method, and then, a heat treatment is conducted in which the rate of temperature rise is controlled.

7. The method of plating on a glass base plate according to claim 6, wherein the glass base plate with the electroless plating film is maintained at a treatment temperature in the range of 250° C. to 300° C. for at least 1 hour and wherein the time taken to increase the temperature of the glass base plate from room temperature to the treatment temperature is at least 2 hours.

8. The method of plating on a glass base plate according to claim 7, wherein the plating film is formed of a Ni—P alloy containing phosphorus in a range of 1.0 wt % to 13.0 wt % and to a thickness of at least 1.0 μm by the electroless plating method.

9. The method of plating on a glass base plate according to claim 1, wherein a silane coupling agent layer is formed on the glass base plate by the silane coupling agent treatment, a palladium catalyst layer is formed on the silane coupling agent layer by the palladium catalyst treatment, and a soft magnetic plating layer is formed on the palladium catalyst layer by the electroless plating method.

10. The method of plating on a glass base plate according to claim 9, wherein the soft magnetic plating layer is formed of a soft magnetic plating film having a thickness in a range of 0.2 μm to 3 μm and composed of a Co—Ni—P alloy containing phosphorus in a range of 3 at % to 20 at % and at least 45 at % of cobalt in proportion to the number of atoms of cobalt and nickel (Co/(Co+Ni)).

11. The method of plating on a glass base plate according to claim 1, wherein said plating layer film is Ni—P plating layer or Co—Ni—P plating layer.

12. The method of plating on a glass base plate according to claim 1, wherein said glass activation treatment increases the quantity of silanol groups on the surface of the base plate at least by a factor of at least three.

* * * * *